(12) United States Patent
Ravasio et al.

(10) Patent No.: US 7,940,575 B2
(45) Date of Patent: May 10, 2011

(54) MEMORY DEVICE AND METHOD PROVIDING LOGIC CONNECTIONS FOR DATA TRANSFER

(75) Inventors: Roberto Ravasio, Presezzo (IT); Andreas Kux, Haar (DE); Detlev Richter, Munich (DE); Girolamo Gallo, Padua (IT); Josef Willer, Riemerling (DE); Ramirez Xavier Veredas, Munich (DE)

(73) Assignee: QIMONDA AG, Munich (DE)

( * ) Notice: Subject to any disclaimer, the term of this patent is extended or adjusted under 35 U.S.C. 154(b) by 389 days.

(21) Appl. No.: 12/058,191

(22) Filed: Mar. 28, 2008

(65) Prior Publication Data
US 2009/0244949 A1 Oct. 1, 2009

(51) Int. Cl.
*G11C 7/10* (2006.01)
*G11C 8/12* (2006.01)
*G11C 16/06* (2006.01)

(52) U.S. Cl. ......... 365/189.02; 365/230.03; 365/230.05; 365/185.05; 365/185.03; 365/189.17; 365/185.11

(58) Field of Classification Search ............. 365/189.02, 365/230.03, 230.05, 185.17, 185.05, 185.03, 365/189.17, 185.11
See application file for complete search history.

(56) References Cited

U.S. PATENT DOCUMENTS

| 6,038,636 A * | 3/2000 | Brown et al. ............... 711/103 |
| 7,196,962 B2 * | 3/2007 | Lee ........................... 365/230.05 |
| 2008/0137461 A1 * | 6/2008 | Pyeon et al. ............... 365/219 |

OTHER PUBLICATIONS

Campardo, G., et al., "VLSI-Design of Non-Volatile Memories," Springer Science+Business Media, 2005, Table of Contents and chapters 7, 8, and 9, pp. 151-215, Springer-Verlag, Berlin, Germany.

* cited by examiner

*Primary Examiner* — J. H. Hur
(74) *Attorney, Agent, or Firm* — John S. Economou

(57) ABSTRACT

In an embodiment, a method for transferring data in a memory device is provided. The method may include transferring data from a first memory cell arrangement including a plurality of memory cells to a second memory cell arrangement including a plurality of memory cells via a connecting circuit arrangement coupled to the plurality of memory cell arrangements and providing a plurality of controllable connections via a plurality of connecting circuit terminals, the memory cell arrangements being connected with at least one connecting circuit terminal of the plurality of connecting circuit terminals, wherein the connecting circuit is configured to provide arbitrarily controllable signal flow connections between the plurality of connecting circuit terminals. The data are transferred via a logic connection using the controllable connections. Simultaneously, a further logic connection may be provided to a memory cell arrangement of the memory cell arrangements using the controllable connections.

15 Claims, 19 Drawing Sheets

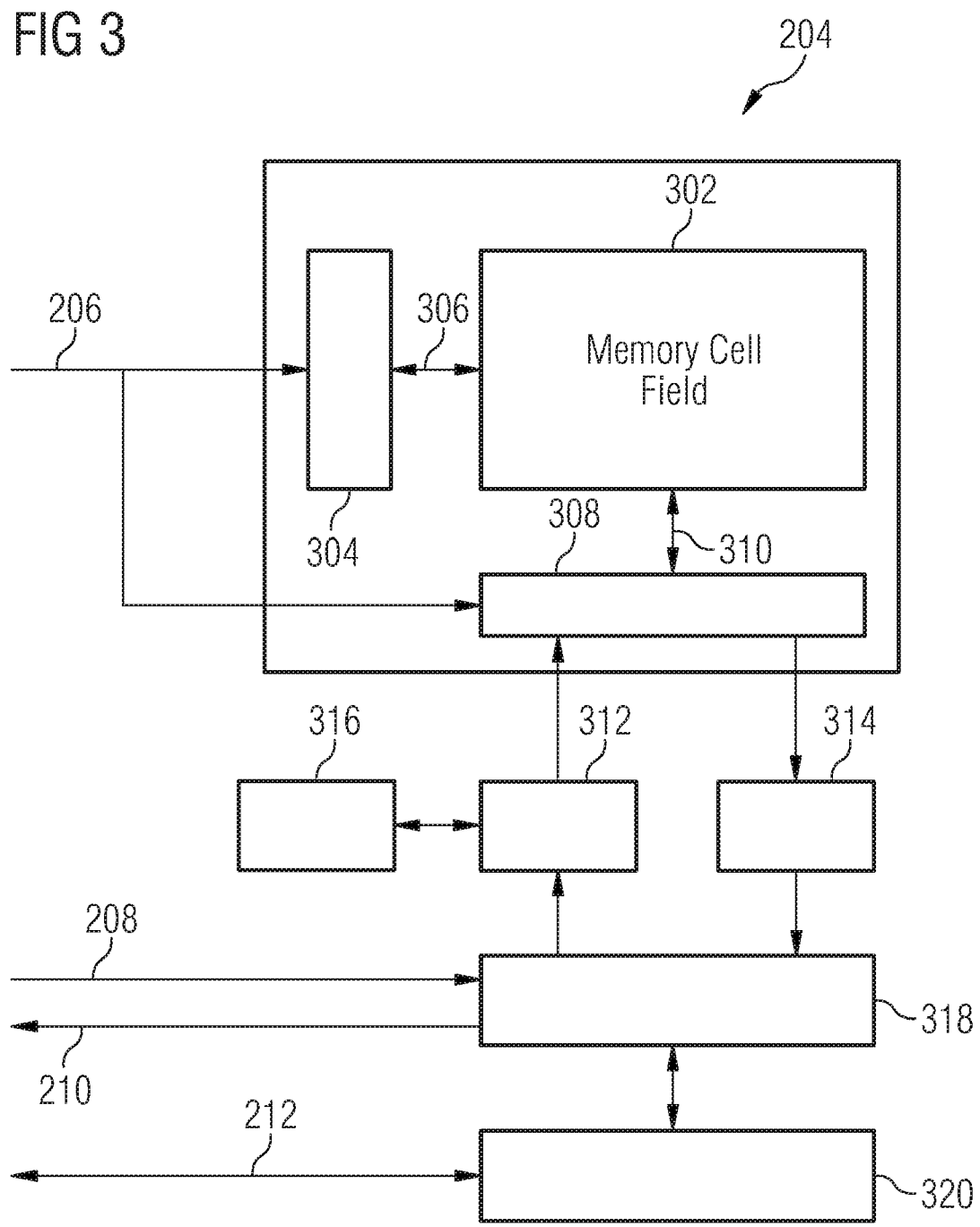

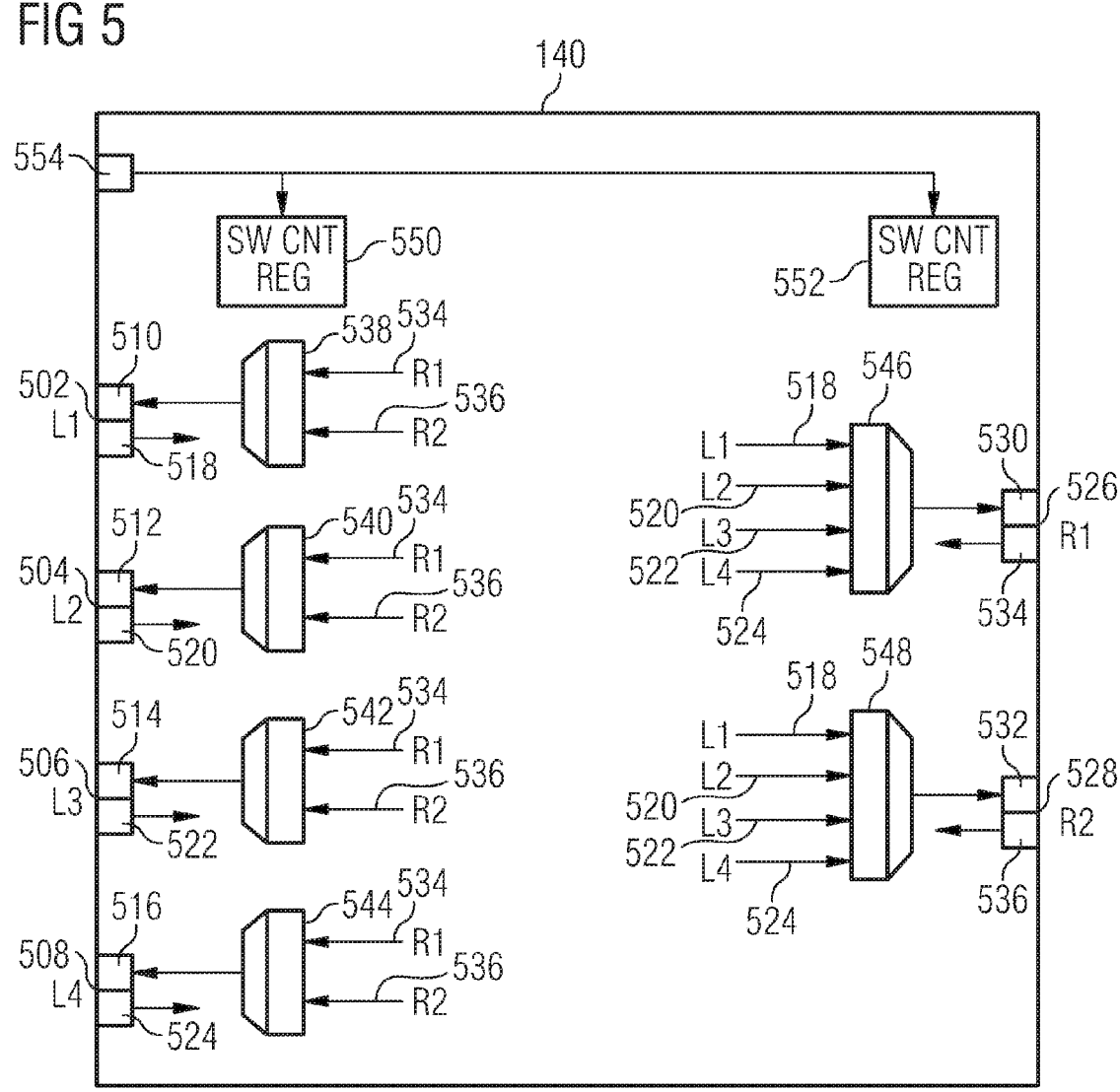

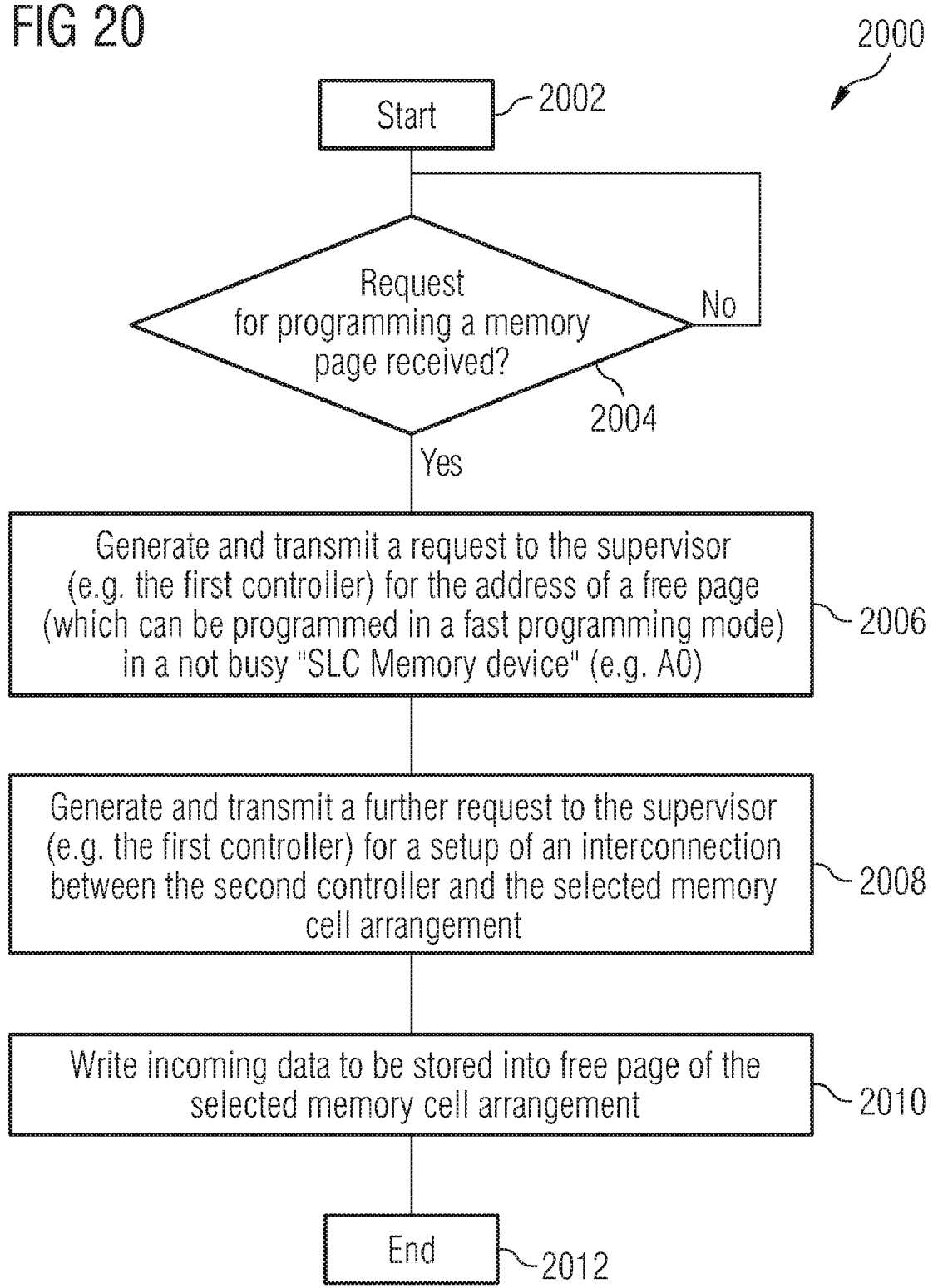

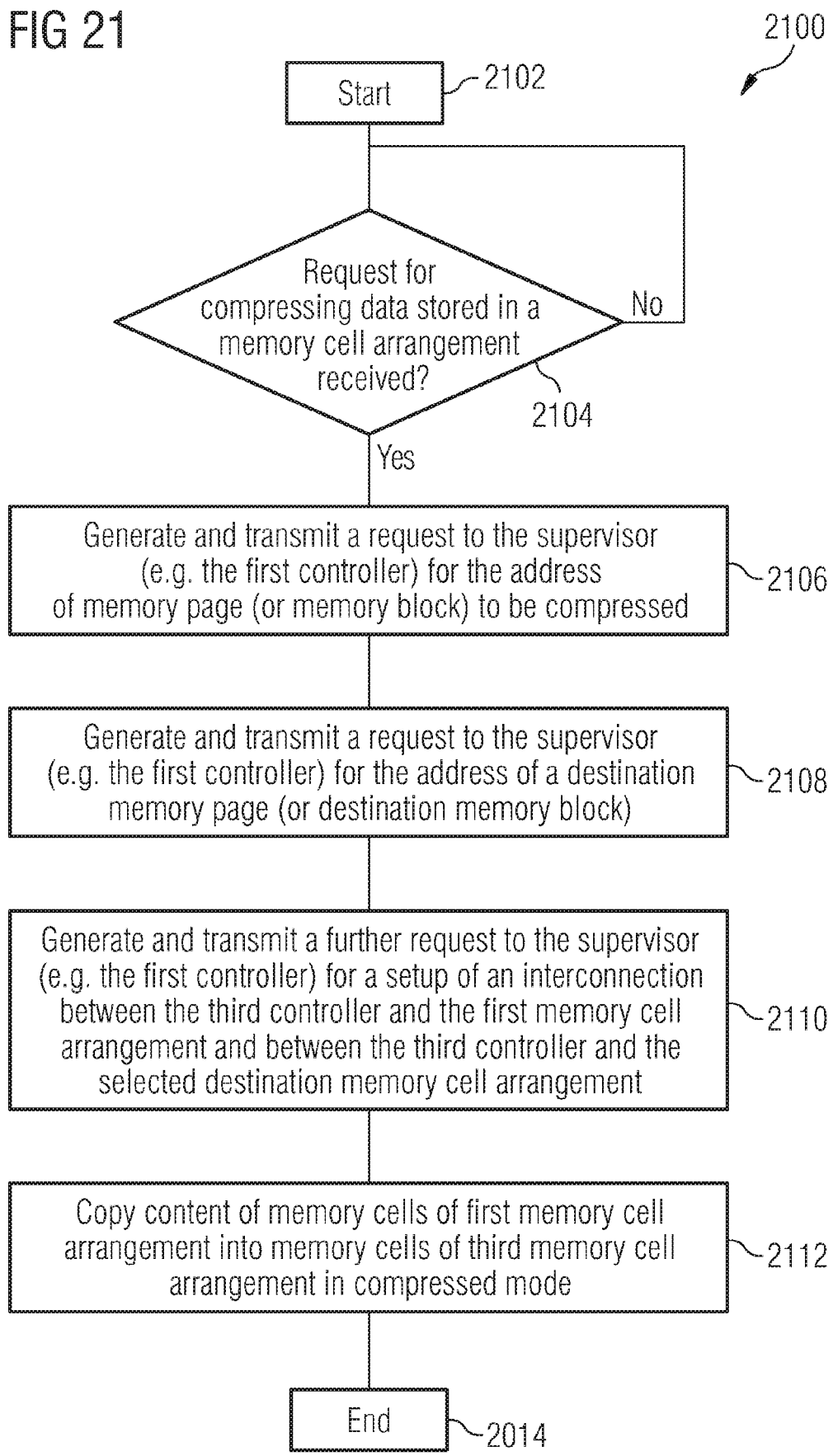

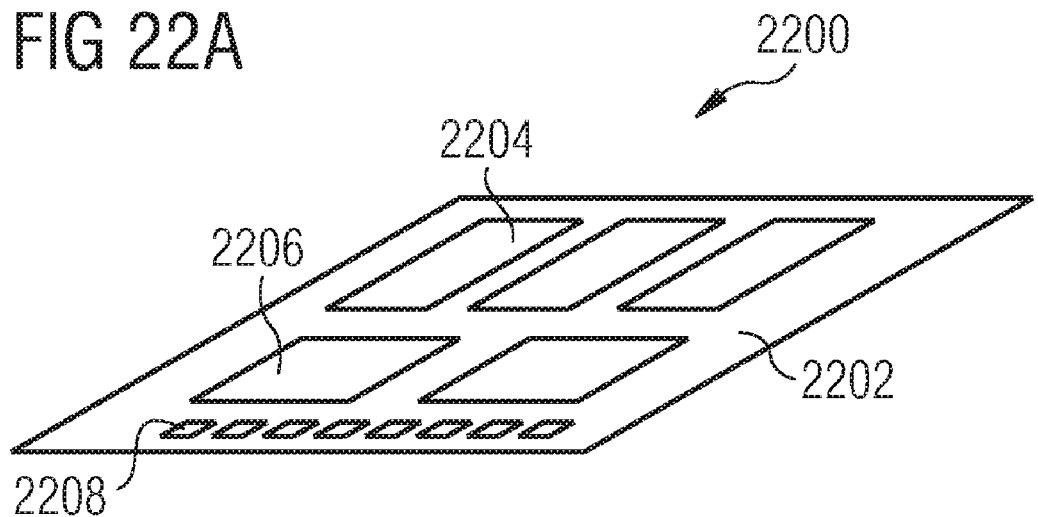
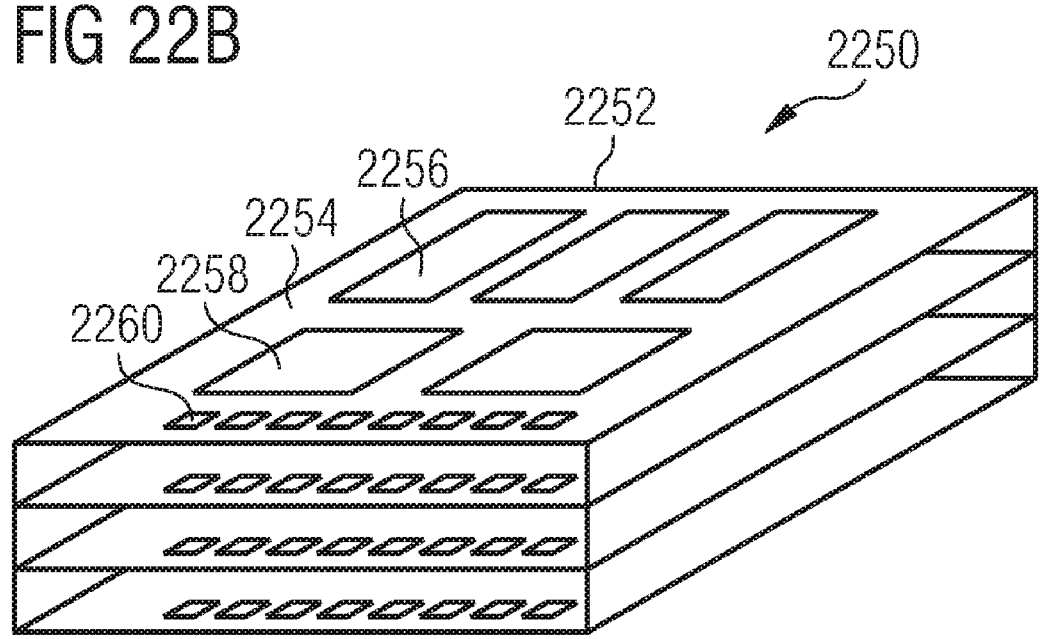

MEMORY DEVICE AND METHOD PROVIDING LOGIC CONNECTIONS FOR DATA TRANSFER

TECHNICAL FIELD

Embodiments relate generally to a memory device and a method providing logic connections for data transfer.

BACKGROUND

There is an intensive market pressure to provide a huge and dense memory system at as low cost per bit as possible. Thus, NAND storage systems are developed having assembled an increasing number of NAND memory cell arrangements. At the same time, the used memory cells may become multi-bit memory cells or multi-level memory cells. The use of these memories will require more elaboration power and bandwidth between memories and memory controllers.

In a conventional NAND memory system, one or a plurality of memory controllers are provided and are connected to NAND memory cells via one or more NAND buses.

BRIEF DESCRIPTION OF THE DRAWINGS

In the drawings, like reference characters generally refer to the same parts throughout the different views. The drawings are not necessarily to scale, emphasis instead generally being placed upon illustrating the principles of various implementations. In the following description, various embodiments are described with reference to the following drawings, in which:

FIG. 3 shows a memory of FIG. 2 in accordance with an embodiment;

FIG. 5 shows a connecting circuit arrangement in accordance with an embodiment;

FIG. 20 shows a method implemented in the second controller of FIG. 12 in accordance with an example;

FIG. 21 shows a method implemented in the third controller of FIG. 12 in accordance with an example; and FIGS. 22A and 22B show a memory module (FIG. 22A) and a stackable memory module (FIG. 22B) in accordance with an embodiment.

DETAILED DESCRIPTION OF ILLUSTRATIVE EMBODIMENTS

In the description, the terms "connect" and "couple" are intended to include a direct as well as an indirect "connect" and "couple", respectively. Accordingly, components that are connected or coupled to each other may contact each other. Alternatively, these components may not contact each other, a third element being interposed between them.

Figure 1:
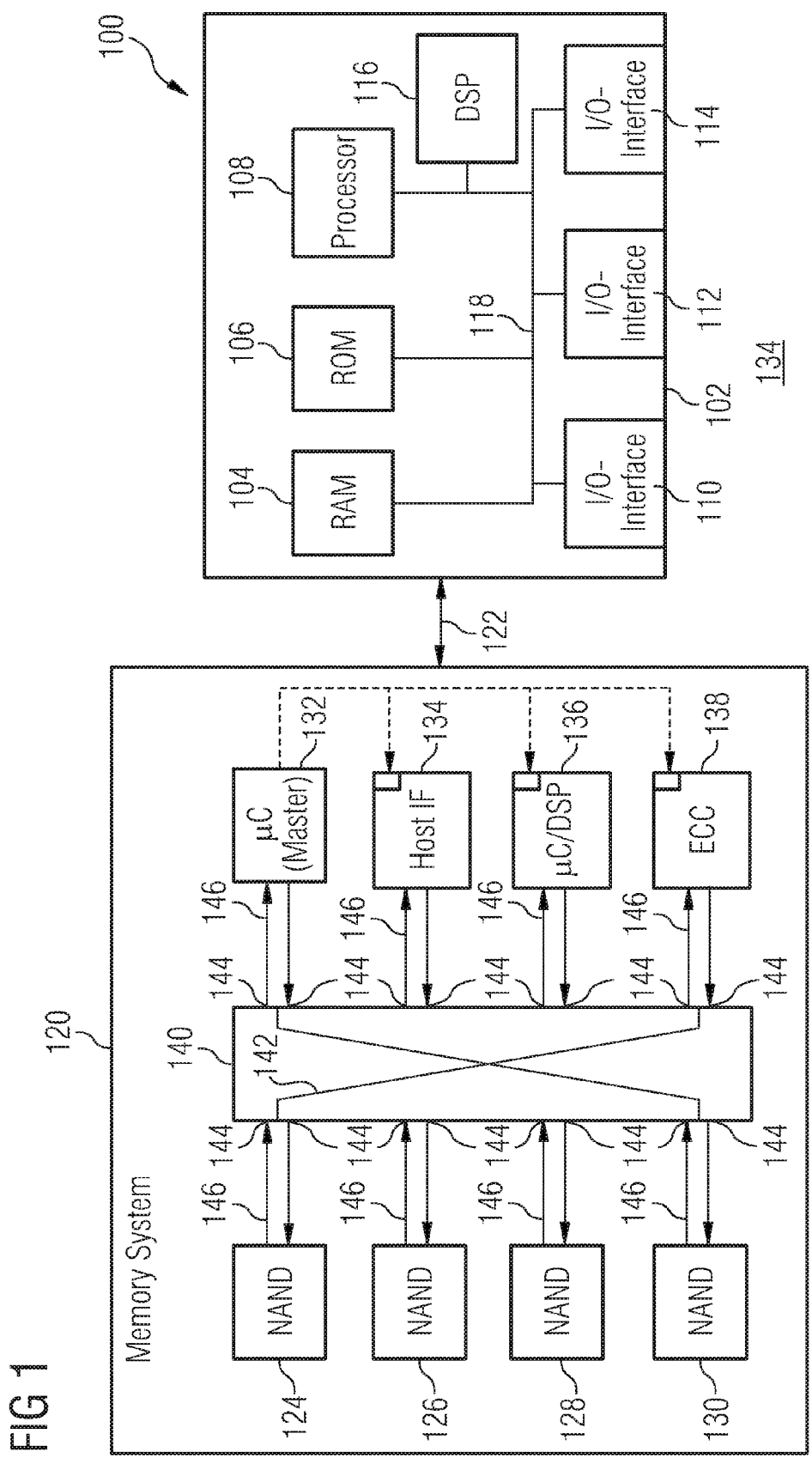
FIG. 1 shows a computer system having a memory device in accordance with an embodiment.

FIG. 1 shows a computer system 100 having a computer arrangement 102 and a memory device 120 in accordance with an embodiment.

In various embodiments, the computer arrangement 102 may be configured as or may include any device having a processor, e.g., having a programmable processor such as, e.g., a microprocessor (e.g., a CISC (complex instruction set computer) microprocessor or a RISC (reduced instruction set computer) microprocessor). In various embodiments, the computer arrangement 102 may be configured as or may include a personal computer, a workstation, a laptop, a notebook, a personal digital assistant (PDA), a radio telephone (e.g., a wireless radio telephone or a mobile radio telephone), a camera (e.g., an analog camera or a digital camera), or another device having a processor (such as, e.g., a household appliance (such as, e.g., a washing machine, a dishwashing machine, etc.)).

In an embodiment, the computer arrangement 102 may include one or a plurality of computer arrangement-internal random access memories (RAM) 104, e.g., one or a plurality of computer arrangement-internal dynamic random access memories (DRAM), in which, for example, data to be processed may be stored. Furthermore, the computer arrangement 102 may include one or a plurality of computer arrangement-internal read only memories (ROM) 106, in which, for example, the program code may be stored, which should be executed by a processor 108 (e.g., a processor as described above), which may also be provided in the computer arrangement 102.

Furthermore, in an embodiment, one or a plurality of input/output interfaces 110, 112, 114 (in FIG. 1, there are shown three input/output interfaces, in alternative embodiments, e.g., one, two, four, or even more than four input/output interfaces may be provided) configured to connect one or a plurality of computer arrangement-external devices (such as, e.g., additional memory, one or a plurality of communication devices, one or a plurality of additional processors) to the computer arrangement 102, may be provided in the computer arrangement 102.

The input/output interfaces 110, 112, 114 may be implemented as analog interfaces and/or as digital interfaces. The input/output interfaces 110, 112, 114 may be implemented as serial interfaces and/or as parallel interfaces. The input/output interfaces 110, 112, 114 may be implemented as one or a plurality of circuits, which implements or implement a respective communication protocol stack in its functionality in accordance with the communication protocol which is respectively used for data transmission. Each of the input/output interfaces 110, 112, 114 may be configured in accordance with any communication protocol. In an embodiment, each of the input/output interfaces 110, 112, 114 may be implemented in accordance with one of the following communication protocols:

- an ad hoc communication protocol such as, e.g., Firewire or Bluetooth;
- a communication protocol for a serial data transmission such as, e.g., RS-232, Universal Serial Bus (USB) (e.g., USB 1.0, USB 1.1, USB 2.0, USB 3.0);
- any other communication protocol such as, e.g., Infrared Data Association (IrDA).

In an embodiment, the first input/output interface 110 is a USB interface (in alternative embodiments, the first input/output interface 110 may be configured in accordance with any other communication protocol such as, e.g., in accordance with a communication protocol which has been described above).

In an embodiment, the computer arrangement 102 optionally may include an additional digital signal processor (DSP) 116, which may be provided e.g. for digital signal processing. Furthermore, the computer arrangement 102 may include additional communication modules (not shown) such as, e.g., one or a plurality of transmitters, one or a plurality of receivers, one or a plurality of antennas, and so on.

The computer arrangement 102 may also include additional components (not shown), which are desired or required in the respective application.

In an embodiment, some or all of the circuits or components provided in the computer arrangement 102 may be coupled with each other by means of one or a plurality of computer arrangement-internal connections 118 (for example, by means of one or a plurality of computer busses) configured to transmit data and/or control signals between the respectively coupled circuits or components.

Furthermore, as has been described above, the computer system 100, in accordance with an embodiment, may include the memory cell arrangement 120.

The memory cell arrangement 120 may in an embodiment be configured as an integrated circuit. The memory cell arrangement 120 may further be provided in a memory module having a plurality of integrated circuits, wherein at least one integrated circuit of the plurality of integrated circuits includes a memory device 120, as will be described in more detail below. The memory module may be a stackable memory module, wherein some of the integrated circuit may be stacked one above the other. In an embodiment, the memory device 120 is configured as a memory card.

In an embodiment, the memory device 120 may be coupled to the first input/output interface 110 via a communication connection 122 (e.g., via a USB communication connection).

In an embodiment, the memory device 120 may include (e.g., within one common housing) one or a plurality of memory cell arrangements 124, 126, 128, 130, which will be described in more detail below. In an embodiment, the one or more memory cell arrangements 124, 126, 128, 130, may each include a plurality of memory cells and a control circuit to control the access to the plurality of memory cells of the respective memory cell arrangement, as will be described in more detail below.

The memory cell arrangements 124, 126, 128, 130, may include the same or different types of memory cells.

In an embodiment, each memory cell arrangement 124, 126, 128, 130, may include a memory cell field (e.g., a memory cell array) having a plurality of memory cells. The memory cells may be arranged in the memory cell field in the form of a matrix in rows and columns, or, alternatively, for example, in zig zag form. In other embodiments, the memory cells may be arranged within the memory cell field in any other manner or architecture.

In general, each memory cell may, for example, be coupled with a first control line (e.g. a word line) and with at least one second control line (e.g., at least one bit line).

In an embodiment, in which the memory cells are arranged in the memory cell field in the form of a matrix in rows and columns, a row decoder circuit configured to select at least one row control line (e.g., a word line) of a plurality of row control lines in the memory cell field may be provided as well as a column decoder circuit configured to select at least one column control line (e.g., a bit line) of a plurality of column control lines in the memory cell field.

In an embodiment, the memory cells are non-volatile memory cells.

A "non-volatile memory cell" may be understood as a memory cell storing data even if it is not active. In an embodiment, a memory cell may be understood as being not active, e.g., if currently access to the content of the memory cell is inactive. In another embodiment, a memory cell may be understood as being not active, e.g., if the power supply is inactive. Furthermore, the stored data may be refreshed on a regular timely basis, but not, as with a "volatile memory cell" every few picoseconds or nanoseconds or milliseconds, but rather in a range of hours, days, weeks or months. Alternatively, the data may not need to be refreshed at all in some designs.

The non-volatile memory cells may be memory cells selected from a group of memory cells consisting, e.g., of:

- charge storing random access memory cells (e.g., floating gate memory cells or charge trapping memory cells);
- ferroelectric random access memory cells (FeRAM, FRAM);
- magnetoresistive random access memory cells (MRAM);
- phase change random access memory cells (PCRAM, for example, so called Ovonic Unified Memory (OUM) memory cells);
- conductive filament random access memory cells (e.g., conductive bridging random access memory cells (CBRAM), also referred to as programmable metallization cells (PMC), or carbon-based conductive filament random access memory cells);
- organic random access memory cells (ORAM);
- nanotube random access memory cells (NRAM) (e.g., carbon nanotube random access memory cells);
- nanowire random access memory cells.

In alternative embodiments, also other types of non-volatile memory cells may be used.

In various embodiments, the memory cells may be resistive memory cells.

Furthermore, the memory cells may be electrically erasable read only memory cells (EEPROM).

In an embodiment, the memory cells may be Flash memory cells, e.g., charge storing memory cells such as, e.g., floating gate memory cells or charge trapping memory cells.

In an embodiment, each charge trapping memory cell includes a charge trapping layer structure for trapping electrical charge carriers. The charge trapping layer structure may include one or a plurality of two separate charge trapping regions. In an embodiment, the charge trapping layer structure includes a dielectric layer stack including at least one dielectric layer or at least two dielectric layers being formed above one another, wherein charge carriers can be trapped in at least one dielectric layer. In an example, the charge trapping layer structure may include a charge trapping layer and a lower boundary layer and an upper boundary layer. The charge trapping layer may be disposed between the lower boundary layer and the upper boundary layer. By way of example, the charge trapping layer structure includes a charge trapping layer, which may include or consist of one or more materials being selected from a group of materials that consists of: aluminum oxide ($Al_2O_3$), yttrium oxide ($Y_2O_3$), hafnium oxide ($HfO_2$), lanthanum oxide ($LaO_2$), zirconium oxide ($ZrO_2$), amorphous silicon (a-Si), tantalum oxide ($Ta_2O_5$), titanium oxide ($TiO_2$), and/or an aluminate. An example for an aluminate is an alloy of the components aluminum, zirconium and oxygen (AlZrO). In one embodiment, the charge trapping layer structure includes a dielectric layer stack including three dielectric layers being formed above one another, e.g., a first oxide layer (e.g., silicon oxide), a nitride layer as charge trapping layer (e.g., silicon nitride) on the first oxide layer, and a second oxide layer (e.g., silicon oxide or aluminum oxide) on the nitride layer. This type of dielectric layer stack is also referred to as ONO layer stack. In an alternative embodiment, the charge trapping layer structure includes two, four or even more dielectric layers being formed above one another.

In an embodiment, the memory cells may be multi-bit memory cells. As used herein the term "multi-bit" memory cell is intended to, e.g., include memory cells which are configured to store a plurality of bits by spatially separated electric charge storage regions or current conductivity regions, thereby representing a plurality of logic states.

In another embodiment, the memory cells may be single-level memory cells.

In yet another embodiment, the memory cells may be multi-level memory cells. As used herein the term "multi-level" memory cell is intended to, e.g., include memory cells which are configured to store a plurality of bits by showing distinguishable voltage or current levels dependent on the amount of electric charge stored in the memory cell or the amount of electric current flowing through the memory cell, thereby representing a plurality of logic states.

In another embodiment, the memory cells are volatile memory cells.

A "volatile memory cell" may be understood as a memory cell storing data, the data being refreshed during a power supply voltage of the memory system being active, in other words, in a state of the memory system, in which it is provided with power supply voltage. In an embodiment, a "volatile memory cell" may be understood as a memory cell storing data, the data being refreshed during a refresh period in which the memory cell is provided with a power supply voltage corresponding to the level of the stored data.

Optionally, one or a plurality of logic components may be provided in the memory device 120. The logic components may, for example, be implemented by hard wired logic and/or by one or a plurality of programmable processors, e.g., by means of one or a plurality of programmable processors such as, e.g., one or a plurality of programmable microprocessors (e.g., CISC (complex instruction set computer) microprocessor(s) or RISC (reduced instruction set computer) microprocessor(s)).

By way of example, the one or the plurality of logic components may include one or more types of the following logic components:
- a controller, such as, e.g., a microcontroller or a digital signal processor (DSP),
- a memory device interface configured to provide a communication interface to, e.g., the computer arrangement 102,
- an error detection circuit (e.g., an error detection accelerator circuit),
- an error correction circuit (ECC) (e.g., an error correction accelerator circuit).

FIG. 1 shows in an example four logic components, namely
- a first controller 132, which is configured as a microcontroller and serves as a master controller for the control of the memory device 120 and, e.g., of a connecting circuit arrangement 140, as will be described in more detail below;
- a memory device interface 134 configured to provide a communication interface to the computer arrangement 102, e.g., via the communication connection 122;
- a second controller 136, which may be configured as a digital signal processor (DSP) and may be provided for signal processing purposes in programming into and/or reading data from a memory cell arrangement 124, 126, 128, 130;
- an error correction circuit (ECC) 138 being configured as an error correction accelerator circuit, wherein the error correction circuit 138 may provide one or more error correction algorithms to detect and correct errors in the data stored in one or more of the memory cell arrangements 124, 126, 128, 130; in an example, the error correction circuit 138 may be configured to provide an error correction based on BCH (Bose, Ray-Chaudhuri) codes, on parity bits, on Reed-Solomon (RS) codes, on cyclic redundancy check (CRC) codes or on convolutional codes; in another example, any other type of error correction may be implemented in the error correction circuit 138.

Furthermore, the memory device 120 may include a connecting circuit arrangement 140 coupled to the one or more memory cell arrangements 124, 126, 128, 130, and providing a plurality of controllable connections 142 via a plurality of connecting circuit terminals 144, wherein the memory cell arrangements 124, 126, 128, 130, and/or the logic components 132, 134, 136, 138, being connected with at least one connecting circuit terminal 144 of the plurality of connecting circuit terminals 144, wherein the connecting circuit is configured to provide arbitrarily controllable signal flow connections between the plurality of connecting circuit terminals. Illustratively, the connecting circuit arrangement 140 may have the structure of a crossbar switch. In an embodiment, the connecting circuit arrangement 140 may be configured to provide arbitrarily controllable signal flow connections between the plurality of connecting circuit terminals 144.

In this example, the first controller 132 serves as a master controller for the control of the memory device 120, in other words, the first controller 132 serves as a connecting circuit arrangement 140 controller and is configured to control the connecting circuit arrangement 140 to simultaneously provide a plurality of logic connections to the one or more memory cell arrangements 124, 126, 128, 130, and/or the one or more logic components 132, 134, 136, 138, using the controllable connections.

In an example, a logic connection may be understood as being an abstract representation between two logic nodes. The logic connection may include an individual physical connection, individual virtual paths and parallel physical connections and/or parallel virtual connections.

It should be mentioned, that the above described circuits may be implemented on one or a plurality of dies and may be coupled with each other or may be independent from each other and may be coupled with each other via the connecting circuit arrangement 140.

Various embodiments provide a memory device or memory system that provides a high bandwidth and flexibility between memory cells arrangements (e.g., NAND memory cell arrangements) and/or logic components (such as, e.g., microcontrollers) at low system costs and power consumption.

In an embodiment, the one or more memory cell arrangements 124, 126, 128, 130, and/or the one or more logic components 132, 134, 136, 138, may be coupled with the connecting circuit terminals 144 of the connecting circuit arrangement 140 via bidirectional (or unidirectional) communication connections 146. The communication connections 146 may be point-to-point interconnections between the memory cell arrangement 124, 126, 128, 130, and/or the logic component 132, 134, 136, 138, and the connecting circuit arrangement 140 (which may illustratively be understood as a switch), on the one hand, and between the connecting circuit arrangement 140 and the first controller 132, on the other hand. In an embodiment, the communication connections 146 may be configured having a low pin count (this would reduce the numbers or required pads). Furthermore, the communication connections 146 may be configured as low swing communication connections 146 (this would reduce the power consumption of the memory device).

Figure 2:
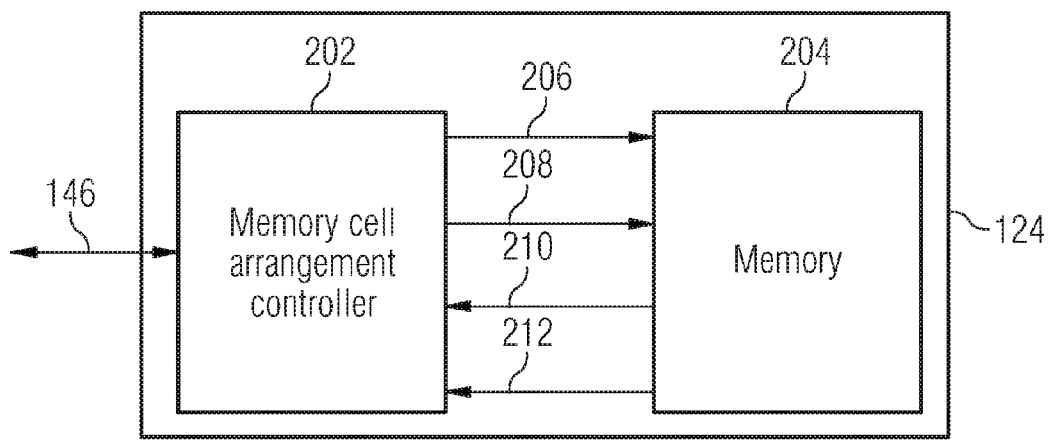
FIG. 2 shows an example of a memory cell arrangement of FIG. 1 in more detail.

FIG. 2 shows an example of a memory cell arrangement 124, 126, 128, 130, in more detail.

The memory cell arrangement 124, 126, 128, 130, may include a memory cell arrangement controller 202 and a memory 204 having a plurality of memory cells. The memory 204 will be described in more detail below.

In an embodiment, the memory cell arrangement controller 202 (which may be configured to control the access to the memory 204) may be coupled with the memory 204 by means of various connections. Each of the connections may include one or a plurality of lines and may thus have a bus width of one or a plurality of bits. Thus, by way of example, an address bus 206 may be provided, by means of which one or a plurality of addresses of one or a plurality of memory cells may be provided by the memory cell arrangement controller 202 to the memory 204, on which an operation (e.g., an erase operation, a write operation, a read operation, an erase verify operation, or a write verify operation, etc.) should be carried out. Furthermore, a data write connection 208 may be provided, by means of which the information to be written into the respectively addressed memory cell may be supplied by the memory cell arrangement controller 202 to the memory 204. Furthermore, a data read connection 210 may be provided, by means of which the information stored in the respectively addressed memory cell may be read out of the memory 204 and may be supplied from the memory 204 to the memory cell arrangement controller 202 and via the memory cell arrangement controller 202 to the computer arrangement 102 (e.g., via the connecting circuit arrangement 140). A bidirectional control/state connection 212 may be used for providing control signals from the memory cell arrangement controller 202 to the memory 204 or for supplying state signals representing the state of the memory 204 from the memory 204 to the memory cell arrangement controller 202.

In an embodiment, the memory cell arrangement controller 202 may be coupled to the connecting circuit arrangement 140 via one of the communication connections 146, for example. Illustratively, the memory cell arrangement controller 202 may be considered as one example of a control circuit to control the access to the plurality of memory cells of the respective memory cell arrangement 124, 126, 128, 130.

In an embodiment, one or more memory cell arrangements of the memory cell arrangements 124, 126, 128, 130, have a serial data input/output interface.

In an embodiment, the memory 204 may include one chip (or die) or a plurality of chips (or dies). Furthermore, the memory cell arrangement controller 202 may be implemented on the same chip (or die) as the components of the memory 204 or on a separate chip (or die).

It should be mentioned that in an alternative example, a memory cell arrangement 124, 126, 128, 130, may include a plurality of memories 204 (e.g., a plurality of NAND memories 204), which may be coupled with and controlled by the memory cell arrangement controller 202 (alternatively by a plurality of memory cell arrangement controllers 202). A memory cell arrangement may include a plurality of sub memory cell arrangements, thereby providing a hierarchical memory cell arrangement structure.

FIG. 3 shows the memory 204 of FIG. 2 in accordance with an embodiment in more detail.

In an embodiment, address signals are supplied to a row decoder circuit 304 and a column decoder circuit 308 by means of the address bus 206, which is coupled to the row decoder circuit 304 and to the column decoder circuit 308. The address signals uniquely identify at least one memory cell to be selected for an access operation (e.g., for one of the above described operations). The row decoder circuit 304 selects at least one row and thus at least one row control line 306 in accordance with the supplied address signal. Furthermore, the column decoder circuit 308 selects at least one column and thus at least one column control line 310 in accordance with the supplied address signal.

The electrical voltages that are provided in accordance with the selected operation, e.g., for reading, programming (e.g., writing) or erasing of one memory cell or of a plurality of memory cells, are applied to the selected at least one row control line 306 and to the at least one column control line 310.

In the case that each memory cell is configured in the form of a field effect transistor (e.g., in the case of a charge storing memory cell), in an embodiment, the respective gate terminal is coupled to the row control line 306 and a first source/drain terminal is coupled to a first column control line 310. A second source/drain terminal may be coupled to a second column control line 310. Alternatively, with a first source/drain terminal of an adjacent memory cell, which may then, e.g., also be coupled to the same row control line 306 (this is the case, e.g., in a NAND arrangement of the memory cells in the memory cell field 302).

In an embodiment, by way of example, for reading or for programming, a single row control line 306 and a single column control line 310 are selected at the same time and are appropriately driven for reading or programming of the thus selected memory cell. In an alternative embodiment, it may be provided to respectively select a single row control line 306 and a plurality of column lines 310 at the same time for reading or for programming, thereby allowing to read or program a plurality of memory cells at the same time.

Furthermore, in an embodiment, the memory 204 includes at least one write buffer memory 312 and at least one read buffer memory 314. The at least one write buffer memory 312 and the at least one read buffer memory 314 are coupled with the column decoder circuit 308. Depending on the type of memory cell, reference memory cells 316 may be provided for reading the memory cells.

In order to program (e.g., write) a memory cell, the data to be programmed may be received by a data register 318, which is coupled with the data write connection 208, by means of the data write connection 208, and may be buffered in the at least one write buffer memory 312 during the write operation.

In order to read a memory cell, the data read from the addressed memory cell (represented, e.g., by means of an electrical current, which flows through the addressed memory cell and the corresponding column control line 310, which may be compared with a current threshold value in order to determine the content of the memory cell, wherein the current threshold value may, e.g., be dependent from the reference memory cells 316) are, e.g., buffered in the read buffer memory 314 during the read operation. The result of the comparison and therewith the logic state of the memory cell (wherein the logic state of the memory cell represents the memory content of the memory cell) may then be stored in the data register 318 and may be provided via the data read connection 210, with which the data register 318 may be coupled.

The access operations (e.g., write operations, read operations, or erase operations) may be controlled by a memory-internal controller 320, which in turn may be controlled by the memory cell arrangement controller 202 by means of the bidirectional control/state connection 212. In an alternative embodiment, the data register 318 may directly be connected to the memory cell arrangement controller 202 by means of the bidirectional control/state connection 212 and thus directly controlled thereby. In this example, the memory-internal controller 320 may be omitted.

In an embodiment, the memory cells of the memory cell field may be grouped into memory blocks or memory sectors, which may be commonly erased in an erase operation. In an embodiment, there are many memory cells included in a memory block or memory sector such that the same amount of data may be stored therein as compared with a conventional hard disk memory sector (e.g., 512 byte), although a memory block or memory sector may alternatively also store another amount of data.

Furthermore, other common memory components (e.g., peripheral circuits such as, e.g., charge pump circuits, etc.) may be provided in the memory 204, but they are neither shown in FIG. 2 nor in FIG. 3 for reasons of clarity.

Figure 4:
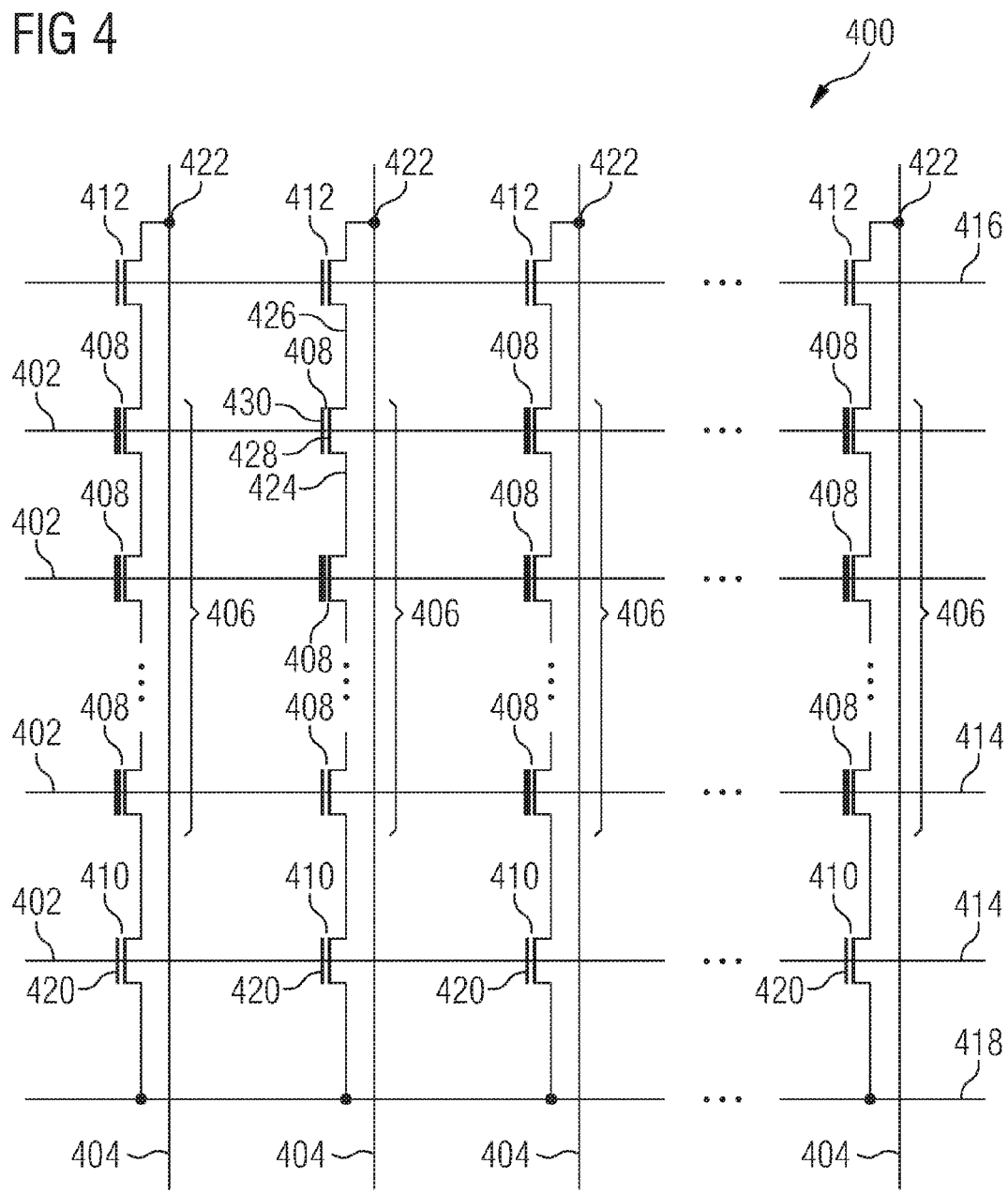
FIG. 4 shows an example of the memory cell field of FIG. 3 in accordance with an embodiment.

FIG. 4 shows a memory cell portion 400 of the memory cell field 302 in accordance with an embodiment.

In one embodiment, the memory cell portion 400 is arranged as a NAND memory cell field (although another coupling architecture may be provided in an alternative embodiment).

In an embodiment, the NAND memory cell portion 400 (e.g., a NAND memory cell array portion 400) may include word lines 402 (in general, an arbitrary number of word lines 402, in one embodiment, 1024 word lines 402) and intersecting bit lines 404 (in general, an arbitrary number of bit lines 404, in one embodiment, 512 bit lines 404).

The NAND memory cell array portion 400 may include NAND strings 406, each NAND string 406 having memory cells 408 (e.g., charge storing memory cells 408 such as, e.g., charge trapping memory cells 408 or floating gate memory cells 408). Furthermore, an arbitrary number of memory cells 408 can be provided in the NAND string 406, in accordance with one embodiment, 32 memory cells 408. The memory cells 408 are connected in series source-to-drain between a source select gate 410, which may be implemented as a field effect transistor, and a drain select gate 412, which may also be implemented as a field effect transistor. Each source select gate 410 is positioned at an intersection of a bit line 404 and a source select line 414. Each drain select gate 412 is positioned at an intersection of a bit line 404 and a drain select line 416. The drain of each source select gate 410 is connected to the source terminal of the first memory cells 408 of the corresponding NAND string 406. The source of each source select gate 410 is connected to a common source line 418. A control gate 420 of each source select gate 410 is connected to the source select line 414.

In one embodiment, the common source line 418 is connected between source select gates 410 for NAND strings 406 of two different NAND arrays. Thus, the two NAND arrays share the common source line 418.

In an embodiment, the drain of each drain select gate 412 may be connected to the bit line 404 of the corresponding NAND string 406 at a drain contact 422. The source of each drain select gate 412 is connected to the drain of the last memory cell 408 of the corresponding NAND string 406. In one embodiment, at least two NAND strings 406 share the same drain contact 422.

In accordance with the described embodiments, each memory cell 408 may include a source 424 (e.g., a first source/drain region), a drain 426 (e.g., a second source/drain region), a charge storage region 428 (e.g., a floating gate stack or a dielectric layer stack) and a control gate 430 (e.g., a gate region). The control gate 430 of each memory cell 408 may be connected to a respective word line 402. A column of the NAND memory cell array portion 400 may include a respective NAND string 406 and a row of the NAND memory cell array portion 400 may include those memory cells 408 that are commonly connected to a respective word line 402.

In an alternative embodiment, the memory cell portion 400 is a NOR memory cell array portion 400. In yet another embodiment, the memory cell portion 400 may be arranged in accordance with any other suitable architecture.

FIG. 5 shows a connecting circuit arrangement 140 in accordance with an embodiment.

It should be noted that in an alternative implementation, a lot of different type of switches may be provided for the connecting circuit arrangement 140. In one example, the connecting circuit arrangement 140 may have a crossbar switch structure.

As shown in FIG. 5, in an implementation, the connecting circuit arrangement 140 may include an arbitrarily configurable plurality of connections between all the connecting circuit terminals. In an exemplary implementation, first type connecting circuit terminals (in FIG. 5 also denoted with the reference numerals L1, L2, L3, L4, respectively) 502, 504, 506, 508, are provided to connect the connecting circuit arrangement 140 with the one or more memory cell arrangements 124, 126, 128, 130. Each first type connecting circuit terminals 502, 504, 506, 508, may include two first type partial connecting circuit terminals, output first type partial connecting circuit terminals 510, 512, 514, 516, to provide signals directed from the connecting circuit arrangement 140 to the respectively connected memory cell arrangement 124, 126, 128, 130, and input first type partial connecting circuit terminals 518, 520, 522, 524, to receive signals from a memory cell arrangement 124, 126, 128, 130, directed to the connecting circuit arrangement 140.

Furthermore, in an implementation of this embodiment, the connecting circuit arrangement 140 may further include second type connecting circuit terminals (in FIG. 5 also denoted with the reference numerals R1, R2, respectively) 526, 528, which may be provided to connect the connecting circuit arrangement 140 with the one or more logic components 132, 134, 136, 138. Each second type connecting circuit terminals 526, 528, may include two second type partial connecting circuit terminals, output second type partial connecting circuit terminals 530, 532, to provide signals directed from the connecting circuit arrangement 140 to the respectively connected logic component 132, 134, 136, 138, and input second type partial connecting circuit terminals 534, 536, to receive signals from a logic component 132, 134, 136, 138, directed to the connecting circuit arrangement 140.

Furthermore, in an implementation of this embodiment, the connecting circuit arrangement 140 may further include first n-to-m multiplexers (n and m being an arbitrary integer value, wherein n may be equal to the number of input second type partial connecting circuit terminals 534, 536 (in this example, n=2), and wherein m may be equal to "1") 538, 540, 542, 544, and second x-to-y multiplexers (x and y being an arbitrary integer value, wherein x may be equal to the number of input first type partial connecting circuit terminals 518, 520, 522, 524, (in this example, x=4), and wherein y may be equal to "1") 546, 548.

A first input of each first n-to-m multiplexer 538, 540, 542, 544, is connected with a first input second type partial connecting circuit terminal 534, and a second input of each first n-to-m multiplexer 538, 540, 542, 544, is connected with a second input second type partial connecting circuit terminal 536. An output of each first n-to-m multiplexer 538, 540, 542, 544, is connected with a respective output first type partial connecting circuit terminal 510, 512, 514, 516.

A first input of each second x-to-y multiplexer 546, 548, is connected with a first input first type partial connecting circuit terminal 518, a second input of each second x-to-y multiplexer 546, 548, is connected with a second input first type partial connecting circuit terminal 520, a third input of each second x-to-y multiplexer 546, 548, is connected with a third input first type partial connecting circuit terminal 522, and a fourth input of each second x-to-y multiplexer 546, 548, is connected with a fourth input first type partial connecting circuit terminal 524. An output of each second x-to-y multiplexer 546, 548, is connected with a respective output second type partial connecting circuit terminal 530, 532.

The first n-to-m multiplexers 538, 540, 542, 544, are controlled by the content of a first connecting circuit control register 550, which may include a control word defining the respective input of the first n-to-m multiplexer 538, 540, 542, 544, to be switched through the respective output of each first n-to-m multiplexer 538, 540, 542, 544.

The second x-to-y multiplexers 546, 548, are controlled by the content of a second connecting circuit control register 552, which may include a control word defining the respective input of the second x-to-y multiplexer 546, 548, to be switched through the respective output of each second x-to-y multiplexer 546, 548.

The first connecting circuit control register 550 and the second connecting circuit control register 552 may be connected to a connecting circuit arrangement control input 554, which may be e.g. coupled to the first controller 132.

Thus, a signal flow connection may be established between any first type connecting circuit terminal 502, 504, 506, 508, and any second type connecting circuit terminal 526, 528.

Figure 18:
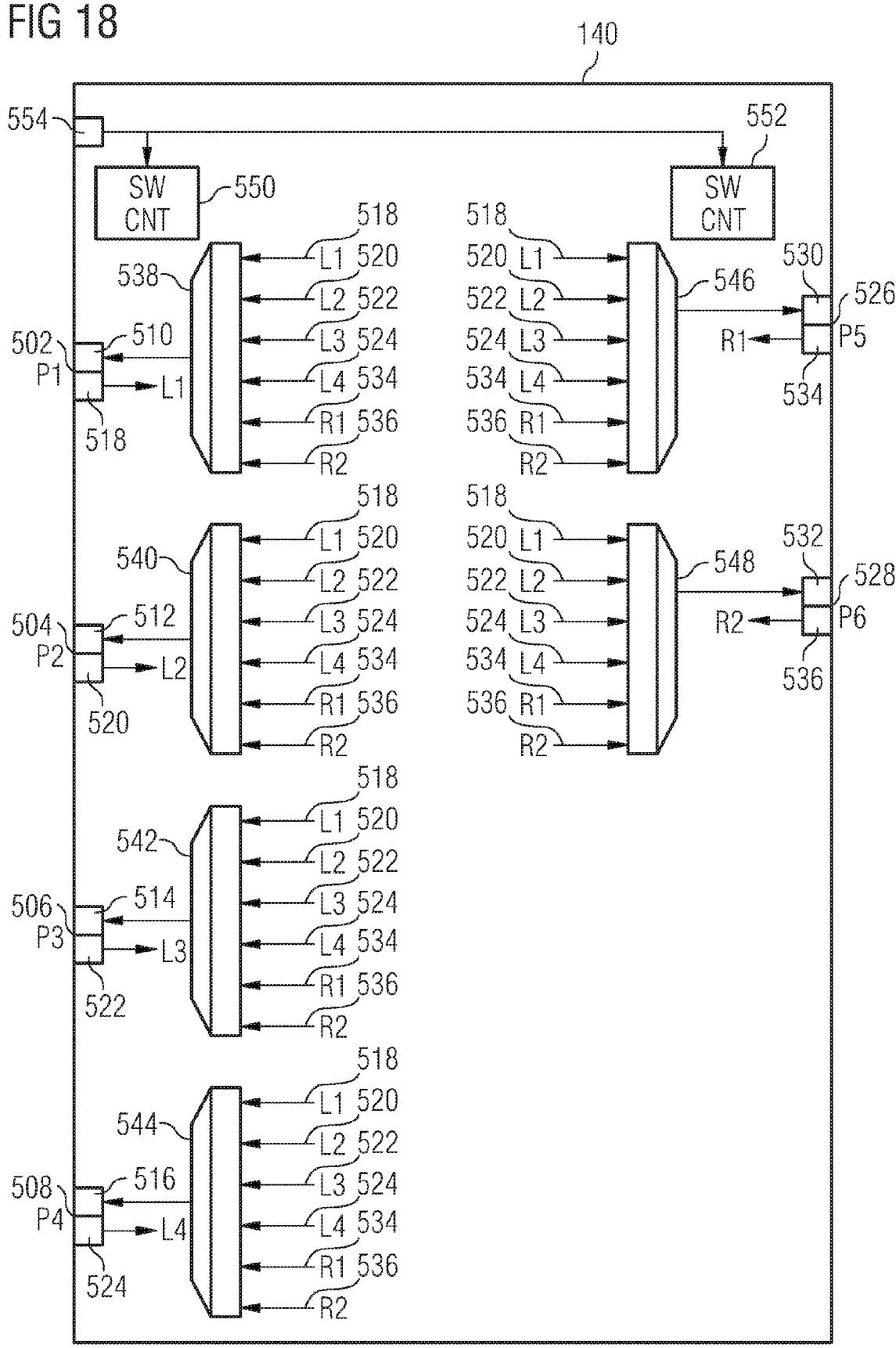
FIG. 18 shows a connecting circuit arrangement in accordance with another embodiment.

In an example, it may also be provided that any input first type partial connecting circuit terminal 518, 520, 522, 524, may be connected to any output first type partial connecting circuit terminal 510, 512, 514, 516 as well as to any output second type partial connecting circuit terminal 530, 532. Furthermore, it may also be provided that any input second type partial connecting circuit terminal 534, 536, may be connected to any output first type partial connecting circuit terminal 510, 512, 514, 516 as well as to any output second type partial connecting circuit terminal 530, 532. In general, any input terminal of the connecting circuit arrangement 140 may be connected to any output terminal of the connecting circuit arrangement 140. In this example, a full crossbar switch would be provided as a connecting circuit arrangement in accordance with another embodiment, e.g., a full crossbar switch 140 as shown in FIG. 18. In this embodiment, the connecting circuit arrangement 140 is similar to that shown in FIG. 5 with the additional features that each one of the first n-to-m multiplexers 538, 540, 542, 544 may have additional inputs, which are connected to the respective input first type partial connecting circuit terminals 518, 520, 522, 524 (thus, in this example, n may be equal to the number of input second type partial connecting circuit terminals 534, 536 plus the number of input first type partial connecting circuit terminals 518, 520, 522, 524 (in this example, n=6), and wherein m may be equal to "1"). Furthermore, each one of the second x-to-y multiplexers may have additional inputs which are connected to the respective input second type partial connecting circuit terminals 534, 536 (thus, in this example, n may be equal to the number of input second type partial connecting circuit terminals 534, 536 plus the number of input first type partial connecting circuit terminals 518, 520, 522, 524 (in this example, x=6), and wherein y may be equal to "1").

In an embodiment, using the connecting circuit arrangement 140, each memory cell arrangement 124, 126, 128, 130, and/or each logic component 132, 134, 136, 138, may be assigned one or more logical connections to another one of the one or more memory cell arrangements 124, 126, 128, 130, and/or the one or more logic components 132, 134, 136, 138.

In an embodiment, the connecting circuit arrangement may be configured to provide arbitrarily controllable signal flow connections between the plurality of connecting circuit terminals in accordance with a circuit switch technology. In other words, the logical connections may be provided using circuit switch technology. An example of such a connecting circuit arrangement 1900 is shown in FIG. 19.

Figure 19:
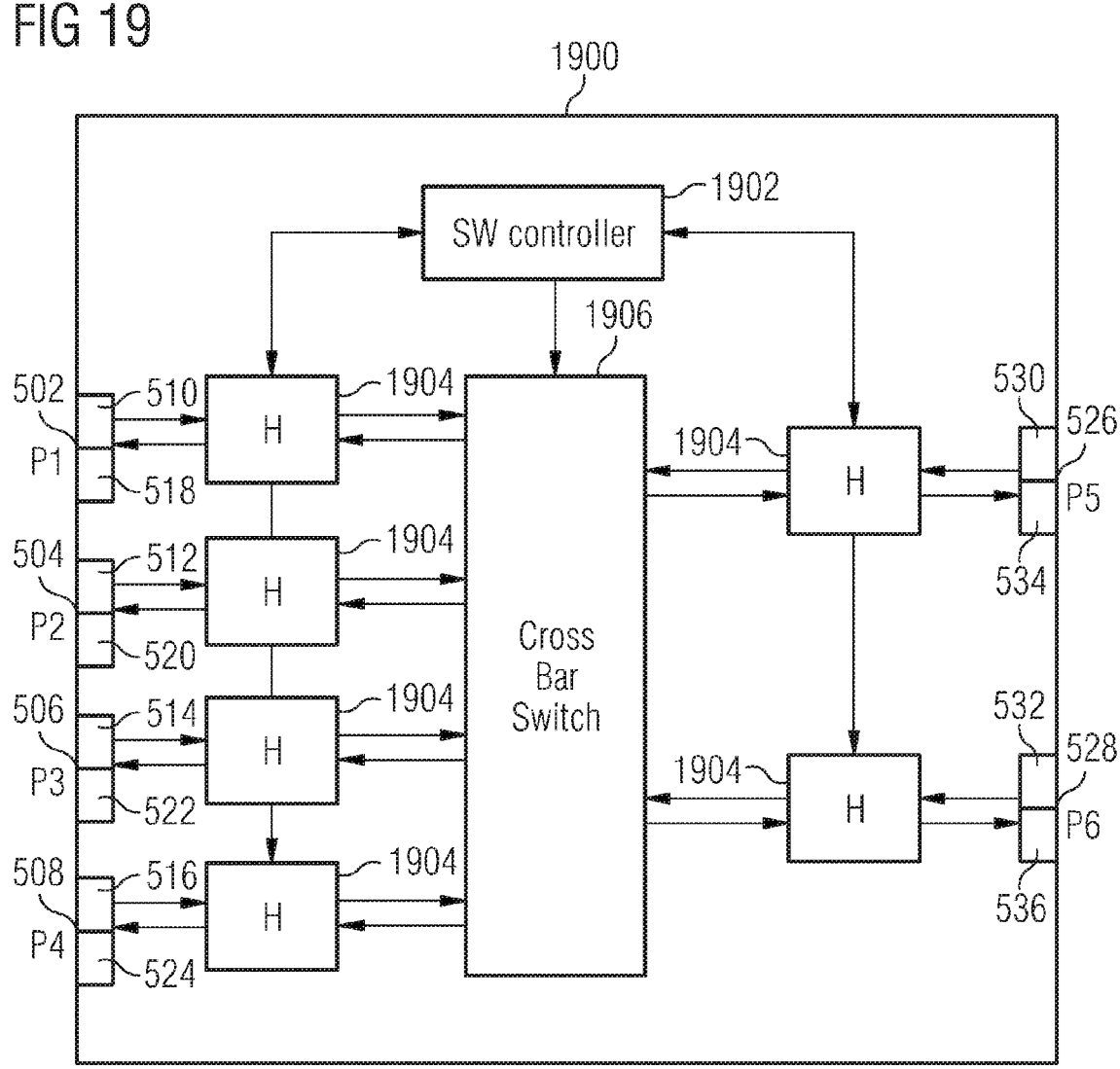
FIG. 19 shows a connecting circuit arrangement in accordance with yet another embodiment.

In the connecting circuit arrangement 1900 as shown in FIG. 19, the interconnections between the ports are controlled by a (internal or external) connecting circuit arrangement controller 1902 that is configured to write into the cross switch control registers 550 and 552 (not shown in FIG. 19).

In this example, the connecting circuit arrangement controller 1902 has a plurality of functions within the context of a circuit switching operation and may therefore be configured to:

receive data packets on his inputs;
read the optionally provided destination field in the optionally provided packets;
request the setup of the proper connections; and
address the optionally provided packet through the selected path;
manage contention (this feature is optional);
manage queue on his outputs (this feature is optional)

In this example, the connecting circuit arrangement 1900 may include destination field determination circuits (in FIG. 19 also denoted as H blocks) 1904, which are able to recognize and determine the destination field in a packet. When this happens, the respective destination field determination circuit 1904 may send a request to the connecting circuit arrangement controller 1902 (e.g., implemented in software) to manage the set-up of the internal cross bar switch 1906, which may be configured similar to the connecting circuit arrangement 140 as shown in FIG. 5 or in FIG. 18, to set up the proper connection.

In another embodiment, the connecting circuit arrangement 140 may be configured to provide arbitrarily controllable signal flow connections between the plurality of connecting circuit terminals in accordance with a packet switch technology. In other words, the logical connections may be provided using packet switch technology. In this embodiment, it may be provided, that the communication between the one or more memory cell arrangements 124, 126, 128, 130, and/or the one or more logic components 132, 134, 136, 138, may be provided using data packets routed by the connecting circuit arrangement 140.

In an implementation, the first controller 132 functions as a master controller for the communication between the one or more memory cell arrangements 124, 126, 128, 130, and/or the one or more logic components 132, 134, 136, 138, and thus may configure the connecting circuit arrangement 140 to set up the required links or controllable connections 142 and thus the logic connections between the one or more memory cell arrangements 124, 126, 128, 130, and/or the one or more logic components 132, 134, 136, 138.

Figure 6:
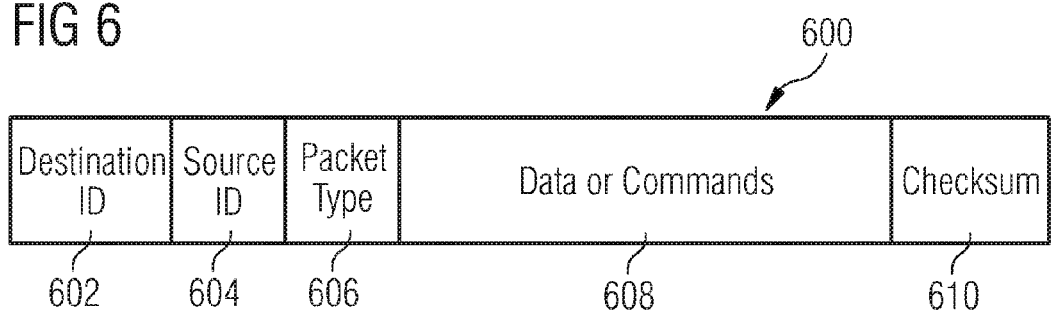
FIG. 6 shows an example of the structure of a data packet in accordance with an embodiment.

In the following, FIG. 6 shows an example will be described of the embodiment using packet switch technology. An example of the structure of a data packet 600 which may be provided for communication between the one or more memory cell arrangements 124, 126, 128, 130, and/or the one or more logic components 132, 134, 136, 138, is shown in FIG. 6.

The data packet 600 may include various data packet fields such as, e.g.:
- a destination identification field 602 including a destination identifier identifying the destination address of the data packet 600 (e.g. an identifier (ID) assigned to a memory cell arrangement 124, 126, 128, 130, or a logic component 132, 134, 136, 138, the data packet 600 should be sent to); this field is optional and system dependent;
- a source identification field 604 including a source identifier identifying the source address of the data packet 600 (e.g. an identifier (ID) assigned to a memory cell arrangement 124, 126, 128, 130, or a logic component 132, 134, 136, 138, the data packet 600 is sent from); this field is optional and system dependent;
- a data packet type field 606 including an information about the type of data packet 600 (e.g. as to whether the data packet 600 is a data packet including user data (e.g., data to be stored in a memory cell arrangement or data read from a memory cell arrangement) or a data packet including command data for controlling e.g. a memory cell arrangement);
- user data or command data field 608 including user data or command data (e.g., data to be stored in a memory cell arrangement or data read from a memory cell arrangement) or command data for controlling e.g. a memory cell arrangement);
- a checksum field 610 including a checksum being calculated, e.g., over the previously described fields 602, 604, 606, 608.

It should be noted that any other type or structure of a data packet including other or additional data packet fields may be provided in an alternative example depending on the provided communication protocols, for example.

Figure 7:
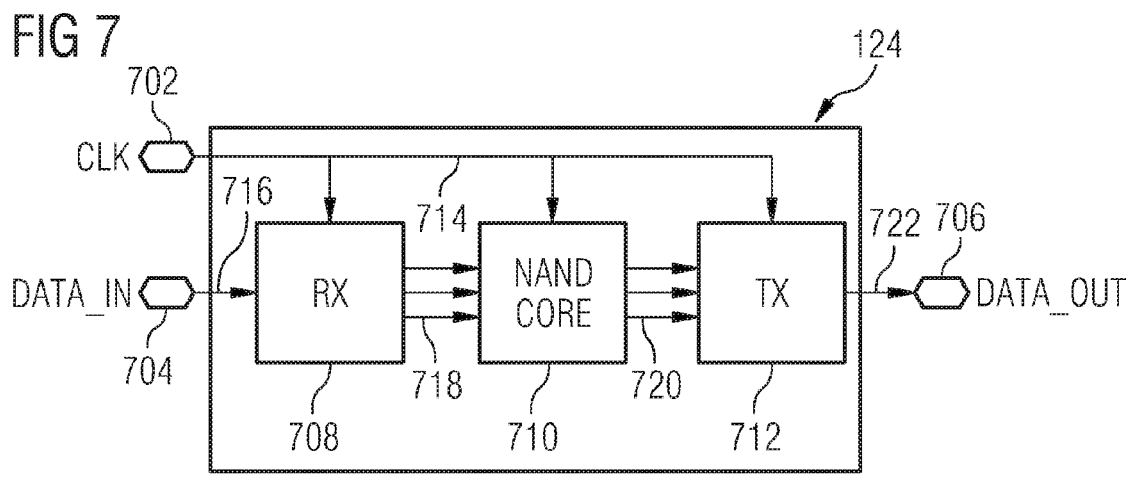
FIG. 7 shows another example of a memory cell arrangement of FIG. 1 in more detail.

FIG. 7 shows another example of a memory cell arrangement 124, 126, 128, 130, of FIG. 1 in more detail.

In this example, the memory cell arrangement 124, 126, 128, 130 may include:
- a clock input 702 configured to receive a clock signal CLK,
- a serial data input 704 (in an alternative example, a parallel data input may be provided) configured to receive data signals DATA_IN,
- a serial data output 706 (in an alternative example, a parallel data output may be provided) configured to output data signals DATA_OUT,
- a receiver circuit 708, which is configured to receive the data signals DATA_IN via the serial data input 704, wherein the receiver circuit 708 includes a receiver data input coupled to the serial data input 704 via a data input connection 716, a receiver clock input coupled to the clock input 702 via a clock input connection 714 to receive the clock signal CLK, and one or more receiver data outputs,
- a memory cell arrangement core circuit 710, which may have the same structure as the memory cell arrangement described with reference to FIG. 2, wherein the memory cell arrangement core circuit 710 includes one or more memory data inputs coupled to the one or more receiver data outputs via one or more first data connections 718, a memory clock input coupled to the clock input 702 via the clock input connection 714, and one or more memory data outputs,
- a transmitter circuit 712, which is configured to transmit data signals (e.g. read from the memory cells of the memory cell arrangement core circuit 710) via the serial data output 706, wherein the transmitter circuit 712 includes one or more transmitter data inputs coupled to the one or more memory data outputs via one or more second data connections 720, a transmitter clock input coupled to the clock input 702 via the clock input connection 714 to receive the clock signal CLK, and a transmitter data output coupled to the serial data output 706 via a data output connection 722.

Figure 8:
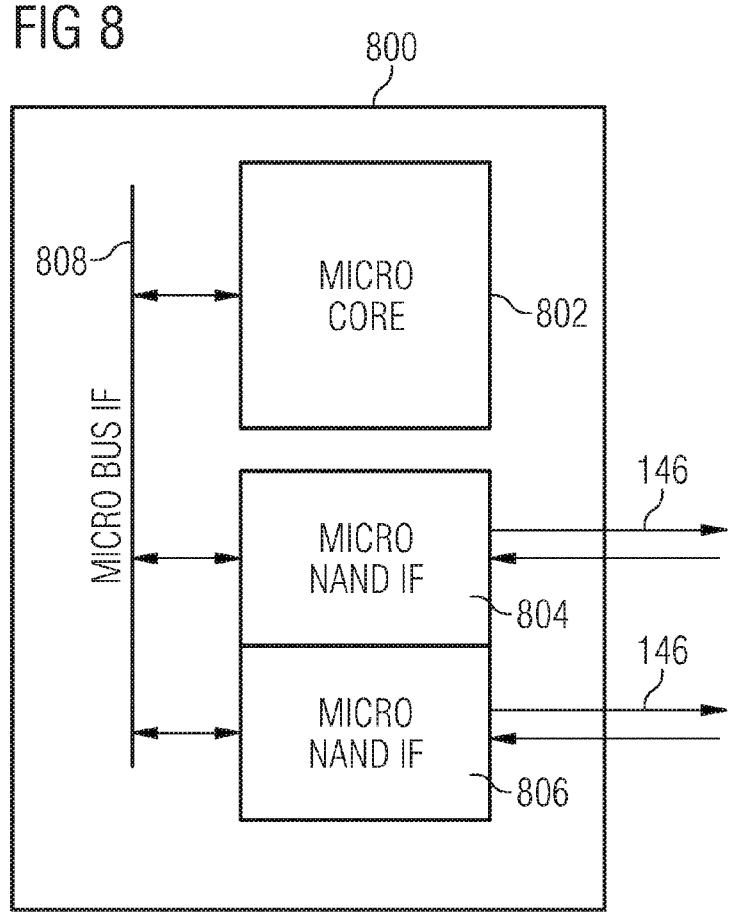
FIG. 8 shows another example of a controller of FIG. 1.

FIG. 8 shows an example of a controller (e.g., controller 132) (in FIG. 8 denoted with reference number 800) of FIG. 1.

In this example, the controller 132 includes a microprocessor core circuit 802 and two NAND memory interface circuits 804 and 806. In this example, the microprocessor core circuit 802 and the two NAND memory interface circuits 804 and 806 are connected with each other via a controller-internal micro bus interface 808 (e.g., implemented as a controller-internal bus).

Figure 9:
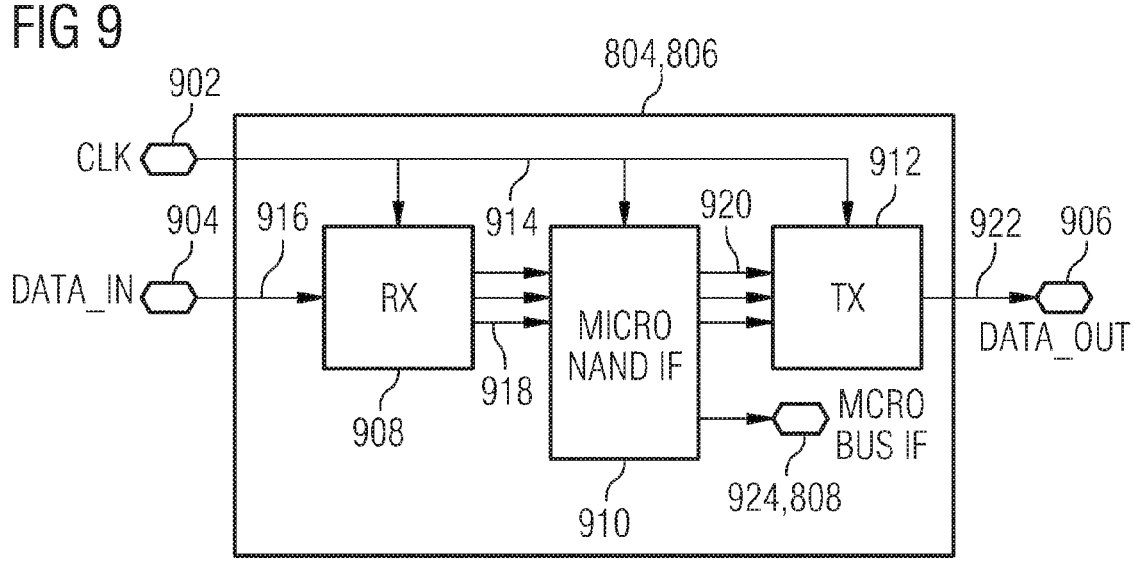
FIG. 9 shows an example of a sub memory cell arrangement of FIG. 8.

FIG. 9 shows NAND memory interface circuit 804, 806, of FIG. 8 in accordance with an exemplary implementation in more detail. In an implementation, the NAND memory interface circuit 804, 806, may include:
- a sub clock input 902 configured to receive a clock signal CLK,
- a sub serial data input 904 (in an alternative example, a sub parallel data input may be provided) configured to receive input data signals DATA_IN,
- a sub serial data output 906 (in an alternative example, a sub parallel data output may be provided) configured to output data signals DATA_OUT,
- a sub receiver circuit 908, which is configured to receive the input data signals DATA_IN via the sub serial data input 904, wherein the sub receiver circuit 908 includes a sub receiver data input coupled to the sub serial data input 904 via a sub data input connection 916 to receive the input data signals DATA_IN, a sub receiver clock input coupled to the sub clock input 902 via a sub clock input connection 914 to receive the clock signal CLK, and one or more sub receiver data outputs,
- a sub logic micro bus interface arrangement circuit 910, which may be configured to:
- convert the data from the receiver 908 into a format accepted (in other words into a format that can be processed) by the microprocessor core circuit 802; and
- convert the data from the microprocessor core circuit 802 into a format accepted (in other words into a format that can be processed) by the transmitter 912.

a sub transmitter circuit 912, which is configured to transmit output data signals DATA_OUT (e.g., read from the memory cells of the sub memory cell arrangement core circuit 910) via the sub serial data output 906, wherein the sub transmitter circuit 912 includes one or more transmitter data inputs coupled to the one or more memory data outputs via one or more second sub data connections 920, a sub transmitter clock input coupled to the sub clock input 902 via the sub clock input connection 914 to receive the clock signal CLK, and a sub transmitter data output coupled to the sub serial data output 906 via a sub data output connection 922.

In this example, the sub memory cell arrangement 804, 806 may further include a sub memory cell arrangement bus terminal 924 to be connected to a sub memory cell arrangement bus and via this with the memory cell arrangement controller 802.

Figure 10:
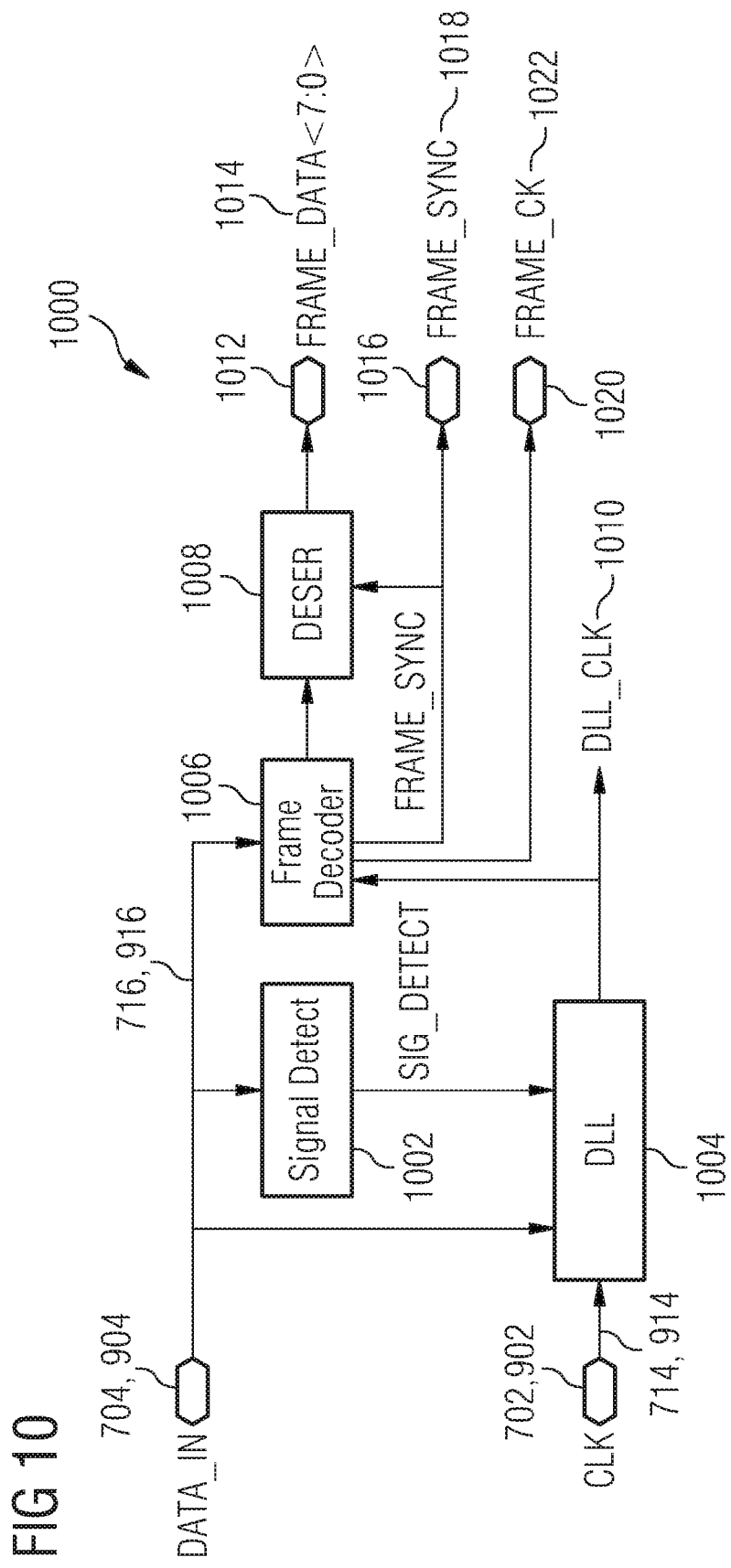
FIG. 10 shows an example of a receiver circuit or a sub receiver circuit.

FIG. 10 shows an example of a receiver circuit 708 or a sub receiver circuit 908. It should be mentioned that also the logic components may include a similar receiver circuit.

In this example, it is assumed that the receiver circuit 708 or 908 and the transmitter circuit 712 or the sub transmitter circuit 912 are not synchronized with each other. However, according to this example, the receiver circuit 708 or 908 provides this synchronization by locking to the incoming data signals. For this reason, in this example, the data signals of the data packets 600 may be encoded into frames 1102 (see frame diagram 1100 in FIG. 11). The rule used to realize the frame 1102 should allow a simple receiver synchronization, an example of which is shown in FIG. 10.

As shown in FIG. 10, the receiver circuit 708 or 908 may include:
a signal detection circuit 1002 having a detect signal input coupled to the (sub) serial data input (904) 704 via the (sub) data input connection (916) 716 to receive the incoming data signal DATA_IN, and a detect signal output, at which a detect signal SIG_DETECT may be provided indicating as to whether a signal has been detected at the (sub) serial data input (904) 704,
a delay locked loop (DLL) circuit 1004 including a DLL clock input coupled to the (sub) clock input (902) 702 via the (sub) clock input connection (914) 714 to receive the clock signal CLK, a DLL data input coupled to the (sub) serial data input (904) 704 via the (sub) data input connection (916) 716 to receive the incoming data signal DATA_IN, a DLL signal detect input coupled to the detect signal output of the signal detection circuit 1002 to receive the detect signal SIG_DETECT, and a synchronization output, at which a synchronization signal clock signal DLL_CLK 1010 may be provided,
a frame decoder circuit 1006 including a frame decoder input coupled to the (sub) serial data input (904) 704 via the (sub) data input connection (916) 716 to receive the incoming data signal DATA_IN, and a synchronization input coupled to the synchronization output of the DLL circuit 1004 to receive the synchronization signal clock signal DLL_CLK 1010, a frame data output, at which a serialized frame data signal may be provided, a frame synchronization output, at which a frame synchronization signal FRAME_SYNC 1018 may be provided (the frame synchronization output is coupled to a frame synchronization output terminal 1016), and a frame clock output, at which a frame clock signal FRAME_CK 1022 may be provided (the frame clock output is coupled to a frame clock output terminal 1020), and
a de-serializer circuit 1008 configured to de-serialize the received serialized frame data signal, wherein the de-serializer circuit 1008 may include a de-serializer input coupled to the frame data output of the frame decoder circuit 1006 to receive the serialized frame data signal, a de-serializer frame synchronization input coupled to the frame synchronization output of the frame decoder circuit 1006 to receive the frame synchronization FRAME_SYNC 1018, a plurality of frame data outputs coupled to a plurality of frame data output terminals 1012 and providing a frame data output signal FRAME_DATA 1014 (e.g., as a parallelized signal (e.g., having a width of 8 bit).

In an implementation, each memory cell arrangement 124, 126, 128, 130 and/or each logic component 132, 134, 136, 138 may have a receiver circuit or one or more sub receiver circuits as described above. Thus, in an implementation, each memory cell arrangement 124, 126, 128, 130 and/or each logic component 132, 134, 136, 138 may receive a system clock signal CLK (e.g. via the (sub) clock input (902) 702) (wherein the system clock signal may optionally be a slow swing signal and/or a differential signal). An internal DLL clock signal generator (e.g., the delay locked loop (DLL) circuit 1004) may be configured to synchronize its clock signal (e.g., the synchronization signal clock signal DLL_CLK 1010) with the incoming data signal (e.g., via the (sub) data input connection (916) 716).

The DLL clock signal generator (e.g., the delay locked loop (DLL) circuit 1004) is normally deactivated and may be activated (enabled) when transactions are detected on the line via which the data signals DATA_IN are coming in (e.g., the (sub) data input connection (916) 716).

Figure 11:
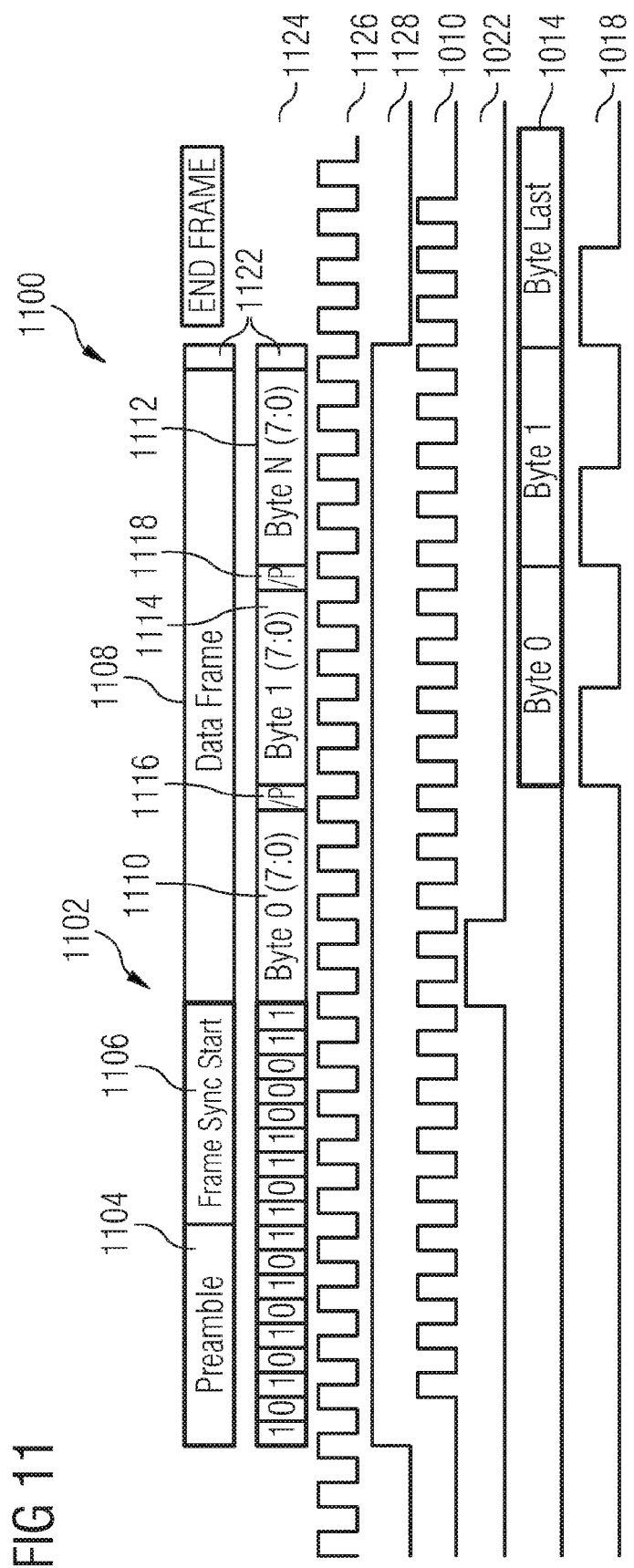
FIG. 11 shows an example of a frame diagram.

In an example, as shown in FIG. 11 a preamble bit sequence 1104 may be provided for locking the DLL clock signal generator. By way of example, after having received a preamble bit sequence 1104 (e.g., having a length of 16 bit, although any number of bits may be provided in an alternative example), the DLL clock signal generator may be locked and may provide an enable signal to a frame decoder circuit (e.g., the synchronization signal clock signal DLL_CLK 1010 to the frame decoder circuit 1006).

In an example, the frame decoder circuit is configured to recover the packet data signals. As shown in FIG. 11, in addition to a frame synchronization start bit sequence 1106, each frame 1102 may include a data frame 1108, which may in turn include the data (e.g. user data to be stored or read from memory cells of a memory cell arrangement, or command data) in data fields 1110, 1112, 1114 (each having a length of, e.g., 1 byte), and a corresponding (not) parity bit 1116, 1118, after each data field 1110, 1112, 1114 (e.g., after each byte of data), which may be transmitted to help to keep the DLL locked and thus to keep the detect signal SIG_DETECT enabled, even in the case of a longer constant bit sequence (in other words in the case of a longer bit sequence without a change of the bit value). Furthermore, in an example, an inverted parity bit 1122 may be provided to mark the end of the frame 1102.

It should be noted that any other suitable encoding technology may be used in an alternative example such as, e.g., a Run Length Limited (RLL) like encoding technology, e.g., to recover synchronization and the frame structure. By way of example, even the clock signal is optional, wherein in this case, e.g., a phase lock loop circuit may be provided to provide the synchronization or another self-synchronization scheme.

FIG. 11 also shows an example of
a received data signal 1124,
a received clock signal 1126,
the detect signal SIG_DETECT 1128, the synchronization signal clock signal DLL_CLK 1010,
the frame clock signal FRAME_CK 1022,
the frame synchronization signal FRAME_SYNC 1018, and
the frame data output signal FRAME_DATA 1014.

By providing a packet switch technology for data transmission within a memory device, any suitable type of communication protocol may be provided to manage the respectively exchanged information and signals (for example, incoming data to be stored in a memory cell arrangement, data to be read from a memory cell arrangement, command data to control e.g. a memory cell arrangement or a logic component).

In an example, a logic memory cell arrangement identification (ID) may be provided for and assigned to each memory cell arrangement of the memory device.

Furthermore, each memory cell arrangement may have a High Speed Serial Interface (HSSI) (e.g., an interface configured similar to a Low Voltage Differential Signaling (LVDS) interface). In this example, a low pin count and low power interface for signal transmission to and from a respective memory cell arrangement may be provided.

In an example, a logic component identification (ID) may be provided for and assigned to each logic component of the memory device, wherein the logical component identification (ID) may be similar to the logic memory cell arrangement identification (ID).

Furthermore, also each logic component may have a High Speed Serial Interface (HSSI) (e.g., an interface configured similar to a Low Voltage Differential Signaling (LVDS) interface). In this example, a low pin count and low power interface for signal transmission to and from a respective memory cell arrangement may be provided.

Each logic component and each memory cell arrangement may be configured in accordance with the respectively provided data transmission protocol (including one or more communication protocols) to allow a data transmission (in general, a communication) between them (e.g., via the connecting circuit arrangement 140).

In an example, the connecting circuit arrangement 140 may be configured to be directly (or indirectly) connected to each memory cell arrangement and/or each logic component of the memory device 120.

In an implementation, the connecting circuit arrangement 140 may include a connection table (which may be dynamically updated, e.g., by the computer arrangement 102 or by the first controller 132, for example, or by another logic component which has the corresponding access rights).

In an example, the connecting circuit arrangement 140 may have a plurality of High Speed Serial Interface (HSSI) (e.g., an interface configured similar to a Low Voltage Differential Signaling (LVDS) interface). In this example, a low pin count and low power interface for signal transmission to and from a respective memory cell arrangement is provided. In an example, the HSSI provided in the connecting circuit arrangement 140 may be similar to the HSSI provided in the correspondingly connected memory cell arrangement or logic component. In an implementation, the connecting circuit arrangement 140, the memory cell arrangements and the logic components all may have the same type of interface (alternatively, only the corresponding interfaces could be of the same type, the interfaces provided for the memory cell arrangements (and thus the corresponding interfaces in the connecting circuit arrangement 140) and the interfaces provided for the logic components (and thus the corresponding interfaces in the connecting circuit arrangement 140) may be different from each other). Furthermore, the number of interfaces provided in the connecting circuit arrangement 140 may be the same as the sum of the number of interfaces provided in the memory cell arrangements and the logic components. Moreover, the logic components may be configured to provide a plurality of virtual channels.

It should be noted that the connecting circuit arrangement 140 and the logic components may be integrated on the same die or may be provided on separate dies.

In various implementations, a memory device is provided which may include a plurality of NAND memory cell arrangements and one or more logic components (e.g., one or more controllers, e.g., microcontrollers, digital signal processors, ECC accelerator circuits, etc.) interconnected by a connecting circuit arrangement (e.g., a switch circuit), wherein the memory device offers a high bandwidth, low power consumption and high flexibility.

In an example, each NAND string structure including a plurality of serially source-to-drain coupled memory cells may have a logic connection to the connecting circuit arrangement (each NAND string structure may include a plurality of NAND strings) (these logic connections may be provided as one or more sub-sets of a plurality of logic channels, and an address resolution may be provided, e.g., partially on the side of the memory cell arrangement. Further, a multiplexing (in the time domain and/or in the frequency domain) may be provided for each channel.

In various embodiments, by providing a connecting circuit arrangement, a large amount of different independent operations (provided by a plurality of memory cell arrangements and/or logic components) in one memory device becomes possible (in other words, a parallel processing may provided (even on one chip) in a memory device).

Furthermore, during carrying out a plurality of independent operations within one memory device, the conventionally provided memory device internal bus is no longer blocked (e.g., during processing data for or from one specific memory cell arrangement).

With such a memory device in accordance with various embodiments, a variety of items related to the storage of information into memory cells (e.g., NAND memory cells) may be addressed, some of which will be described in more detail below.

Figure 12:
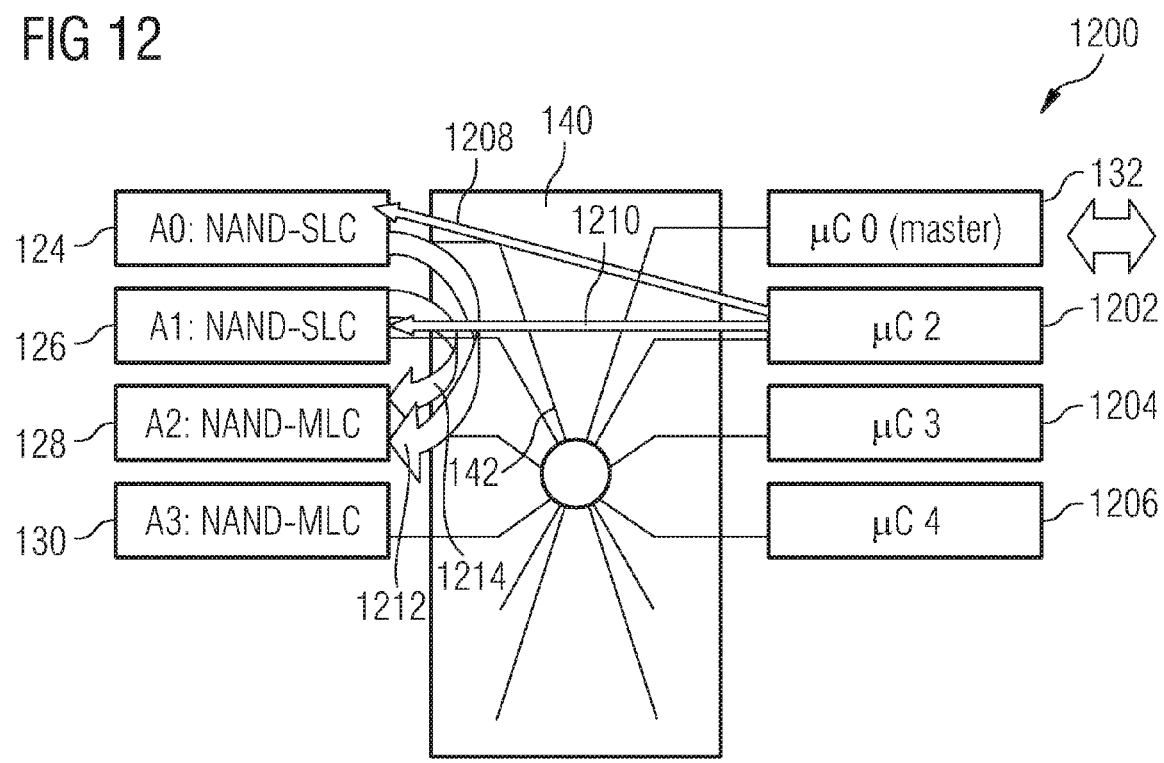
FIG. 12 shows an example of a memory device illustrating an example of a method for operating the memory device.
Figure 13:
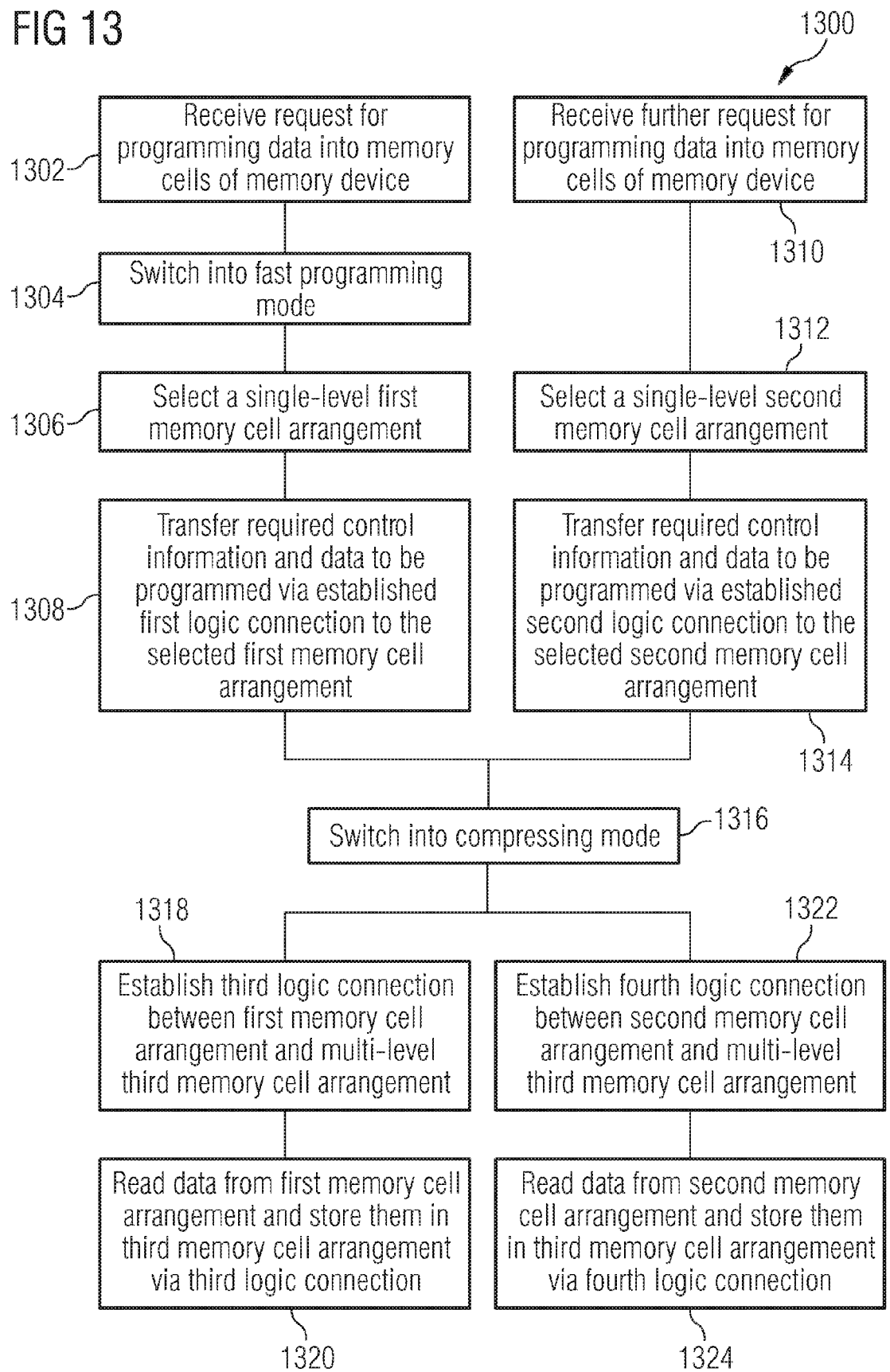
FIG. 13 shows a method for operating the memory device of FIG. 12.

FIG. 12 shows an example of a memory device 1200 illustrating an example of a method for operating the memory device. Furthermore, FIG. 13 shows a method 1300 for operating the memory device 1200.

In this example, a method for multi-phase block programming using the capabilities of the memory device 1200 is provided, wherein the totally available storage capacity and thus the memory is illustratively divided into sub memories, e.g., the memory cell arrangements.

Referring now to FIG. 12, the memory device 1200 may include the first memory cell arrangement 124, the second memory cell arrangement 126, the third memory cell arrangement 128, and the fourth memory cell arrangement 130. In this example, the first memory cell arrangement 124 and the second memory cell arrangement 126 include single-level memory cells (SLC) (e.g., single-level NAND charge storing memory cells), whereas the third memory cell arrangement 128 and the fourth memory cell arrangement 130 include multi-level memory cells (MLC) (e.g., multi-level NAND charge storing memory cells). In general, the first memory cell arrangement 124 and the second memory cell arrangement 126 may have a first storage density, and the third memory cell arrangement 128 and the fourth memory cell arrangement 130 may have a second storage density, wherein the second storage density is higher than the first storage density. In an example, each of the memory cells of the first memory cell arrangement 124 and the second memory cell arrangement 126 may provide a first number of memory states, and each of the memory cells of the third memory cell arrangement 128 and the fourth memory cell arrangement 130 may provide a second number of memory states, wherein the second number of memory states is higher than the first number of memory states.

Furthermore, the memory device 1200 may include the first controller 132, a second controller 1202, a third controller 1204, and a fourth controller 1206. In addition, the connecting circuit arrangement 140 is provided for providing the above described logic connections.

In this example, the second controller 1202 may be configured as a memory device (input/output) interface configured to provide a communication interface to the computer arrangement 102, e.g., via the communication connection 122 and to control the memory cell arrangements 124, 126, 128, 130 (e.g. the data transfer from and to the memory cell arrangements 124, 126, 128, 130).

In this example, in method 1300 (FIG. 13) in 1302, the memory device 1200 receives a request for programming data into the memory cells of the memory device 1200.

Then, in 1304, the memory device 1200 switches into a fast programming mode, in which the second controller 1202 controls the memory device 1200 to program the data into the memory cells of the memory device 1200 as fast as possible. To do this, the second controller 1202 controls the memory device 1200 to program the data into the memory cells of the memory device 1200 using a single level programming scheme. In this scheme, either single-level memory cells are programmed or multi-level memory cells are programmed as single-level memory cells.

In this example, in 1306, the second controller 1202 selects a single-level memory cell arrangement (e.g. the first memory cell arrangement 124) and requests the first controller 132 to provide a first logic connection 1208 between itself and the first memory cell arrangement 124 via the connecting circuit arrangement 140 for programming data therein.

After the first logic connection 1208 between the second controller 1202 and the first memory cell arrangement 124 has been established, in 1308, the second controller 1202 transfers the required control information and the data to be programmed via the established first logic connection to the first memory cell arrangement 124 (e.g., using a plurality of data packets (including command data and the data to be stored in the memory cells of the first memory cell arrangement 124). In other words, in 1308, the second controller 1202 transfers the data required to carry out the requested programming operation to the first memory cell arrangement 124 via the established first logic connection 1208.

Furthermore, in 1310 the memory device 1200 receives a further request for programming data into the memory cells of the memory device 1200.

Being in the fast programming mode, in 1312, the second controller 1202 selects another single-level memory cell arrangement (e.g., the second memory cell arrangement 126) and requests the first controller 132 to provide a second logic connection 1210 between the second controller 1202 and the second memory cell arrangement 126 via the connecting circuit arrangement 140 for programming data therein.

After the second logic connection 1210 between the second controller 1202 and the second memory cell arrangement 126 has been established, in 1314, the second controller 1202 transfers the required control information and the data to be programmed via the established second logic connection 1210 to the second memory cell arrangement 126 (e.g., using a plurality of data packets (including command data and the data to be stored in the memory cells of the second memory cell arrangement 126). In other words, in 1314, the second controller 1202 transfers the data required to carry out the additionally requested further programming operation to the second memory cell arrangement 126 via the established second logic connection 1210.

After having completed the fast programming operations, in 1316, the memory device 1200 switches into a compressing mode. In this mode, the data previously stored in single-level memory cells, are compressed by transferring them to and storing them into multi-level memory cells.

In this example, the data stored in the first memory cell arrangement 124 are transferred to the third memory cell arrangement 128, where a plurality of data bits are stored in the respectively provided multi-level memory cells. This may be done e.g. in 1318, in that the first controller 132 establishes a third logic connection 1212 between the first memory cell arrangement 124 and the third memory cell arrangement 128, and then, in 1320, reads the data stored in the first memory cell arrangement 124 and then stores (programs) them into the multi-level memory cells of the third memory cell arrangement 128 (the data are transferred via the established third logic connection 1212).

Furthermore, in this example, the data stored in the second memory cell arrangement 126 are also transferred to the third memory cell arrangement 128, where a plurality of data bits are stored in the respectively provided multi-level memory cells. This may be done e.g. in 1320, in that the first controller 132 establishes a fourth logic connection 1214 between the second memory cell arrangement 126 and the third memory cell arrangement 128, and then, in 1322, reads the data stored in the second memory cell arrangement 126 and then stores (programs) them into the multi-level memory cells of the third memory cell arrangement 128 (the data are transferred via the established fourth logic connection 1214).

The compressing mode may be provided as a memory device background mode, in other words, the compressing mode may be provided when the memory device 1200 is not receiving or operating any memory device external program or read requests.

In an example, a plurality of memory blocks in the single-level memory cells may be filled with single-level data as long as enough data are available to program a word line block with word line data. Then, the first memory page of each memory block may be read from the single-level memory cells and combined to multi-level data, which then these levels may be programmed to an intermediate state in multi-level memory cells, a little below the target level. This process may be carried out for all "single-level" memory pages.

FIG. 20 shows a method 2000 implemented in the second controller 1202 of FIG. 12 in accordance with an example. Furthermore, FIG. 21 shows a method 2100 implemented in the third controller 1204 of FIG. 12 in accordance with an example. It should be mentioned that the methods 2000 and 21000 may be executed in parallel, in other words, simultaneously.

As shown in FIG. 20, after the start of the method for programming data into memory cells (e.g., a memory page) of one or more memory cell arrangements 124, 126, 128, 130, in 2002, in 2004, it is determined as to whether the second controller 1202 has received a request for programming a memory page, in general, it is determined as to whether the second controller 1202 has received a request for programming data into one or more memory cell arrangements 124, 126, 128, 130. In other words, in 2004, the second controller 1202 illustratively waits until it receives a write request. If the second controller 1202 has received a request for programming data into one or more memory cell arrangements 124, 126, 128, 130 ("Yes" in 2004), in 2006, the second controller 1202 generates and transmits a request to the supervisor (e.g., the master controller, e.g., the first controller 132) for the address of a free memory page (which can be programmed in a fast programming mode (e.g., using a single level programming scheme)) in a memory cell arrangement 124, 126, 128, 130, which is presently not busy and which can be programmed in a fast programming mode. In this example, the first memory cell arrangement 124 may be selected by the supervisor and an address of a free memory page in the first memory cell arrangement 124 may be transmitted to the second controller 1202. After having received the address of a free memory page in the first memory cell arrangement 124, in 2008, the second controller 1202 additionally generates and transmits a further request to the supervisor (e.g., the master controller, e.g., the first controller 132) for a setup of an interconnection between the second controller 1202 and the selected memory cell arrangement, e.g., the first memory cell arrangement 124. After the interconnection has been established (e.g., by the first controller 132), in 2010, the second controller 1202 writes or programs the incoming data to be stored in a memory cell arrangement into the free memory page of the selected memory cell arrangement, e.g., the first memory cell arrangement 124. When the programming operation is completed, the method is ended in 2012.

FIG. 21 shows a method 2100 implemented in the third controller 1204 of FIG. 12 in accordance with an example. In contrast to the example outlined with reference to FIG. 13, in this example, the third controller 1204 is configured to provide the data compression of data stored in the memory cell arrangements 124, 126, 128, 130.

As shown in FIG. 21, after the start of the method for compressing data in 2102, in 2104, it is determined as to whether the third controller 1204 has received a request for compressing data being stored (e.g., stored in one or more memory pages) in one or more of the memory cell arrangements 124, 126, 128, 130. In other words, in 2104, the third controller 1204 illustratively waits until it receives a compress request (e.g., by the first controller 132). If the third controller 1204 has received a request for compressing data being stored (e.g., stored in one or more memory pages) in one or more of the memory cell arrangements 124, 126, 128, 130, ("Yes" in 2104) the third controller 1204 may then, in 2106, generate and transmit a request to the supervisor (e.g., the master controller, e.g., the first controller 132) for the address of the memory page (or memory block, for example) which should be compressed. Furthermore, in 2108, the third controller 1204 may generate and transmit a request to the supervisor (e.g., the master controller, e.g., the first controller 132) for the address of a destination memory page (or destination memory block, for example) into which the data should be compressed (e.g., using a compressing mode (e.g. using a multi-level memory cell arrangement, such as, e.g., having multi-level memory cells (MLC) (e.g., multi-level NAND charge storing memory cells)). In this example, the third memory cell arrangement 128 may be selected by the supervisor and an address of a free memory page in the third memory cell arrangement 128 may be transmitted to the third controller 1204. After having received the address of a free memory page in the third memory cell arrangement 128, in 2110, the third controller 1204 additionally generates and transmits a further request to the supervisor (e.g., the master controller, e.g. the first controller 132) for a setup of an interconnection between the third controller 1204 and the first memory cell arrangement 124 (as the source memory cell arrangement of the data to be compressed) and for a setup of an interconnection between the third controller 1204 and the selected destination memory cell arrangement, in which the data should be stored in a compressed manner, e.g., the third memory cell arrangement 128. After the interconnection has been established (e.g., by the first controller 132), in 2112, the third controller 1204 copies the data (e.g., stored in single-level memory cells in the first memory cell arrangement 124) into, e.g., the multi-level memory cells of the third memory cell arrangement 128 in a compressed mode. Illustratively, the content of the single-level memory cells (e.g., single-level memory pages) of fast programmed, e.g., single-level memory cells are copied into slower but compressed programmed, e.g., multi-level memory cells (e.g., multi-level memory pages) and after having successfully completed the programming of the memory cells in the destination memory cell arrangement (e.g., the multi-level memory cells of the third memory cell arrangement 128), the read single-level memory cells may be erased. Then, the cleaned (erased) single-level memory cells (e.g., the corresponding memory page of the first memory cell arrangement 124) may be released to the supervisor (e.g., the master controller, e.g., the first controller 132).

Then, the compressing (copy) operation is completed and the method is ended in 2114.

In other words, in an example, the third controller 1204 may wait for a supervisor request for a compressing operation. When activated the third controller 1204 may start a copy/compress operation. The copy procedure may be carried out by the third controller 1204. This means that data may be moved from single-level memory cells (e.g., of the first memory cell arrangement 124) to the third controller 1204 and from the third controller 1204 to multi-level memory cells (e.g., of the third memory cell arrangement 128). The third controller 1204 may request that the supervisor establishes all the needed interconnection (statically or dynamically). The second controller 1202, the third controller 1204 and the fourth controller 1206 could have one or more than one interconnections with the connecting circuit arrangement 140. In case only one connection for the compress function is provided, the third controller 1204 may store the information into his internal buffer and dynamically ask to the supervisor to change the interconnection through the source device (e.g., the source memory cell arrangement) and the destination device (e.g., the destination memory cell arrangement).

In the following, an example of a block-wise programming of the multi-level memory cells will be described in more detail. In this example, it is assumed that that all the information that should be programmed into a multi-level memory cell memory page (e.g., of the third memory cell arrangement 128) is already available (stored) in a single-level memory cell memory page (e.g., of the first memory cell arrangement 124). This allows to proceed to program the multi-level memory cell memory page (e.g., multi-level memory cell NAND memory page) in two stages.

1) Write with some programming margin the information for all the multi-level memory cell pages in the selected memory block;

2) Re-write the same data into the final desired position in the selected memory block.

Due to fact that the threshold voltage shift (e.g., due to interference) of the memory cells in this second stage is little, the effect of the second stage programming on the previously programmed memory cells may be negligible.

This process may allow to gain more margin (illustratively the space between threshold voltage distributions) for increased reliability or to increase the number of levels used or provided in the multi-level memory cells, thereby, e.g., increasing the memory cell density (bit/cell).

Illustratively, in an example, a memory device 1200 is provided which achieves a fast programming for a user of the memory device 1200 and an autonomous compression of the programmed data using the capabilities of the connecting circuit arrangement 140. This described programming scheme (with reference to FIGS. 12, 13, 20 and 21, for example) is very attractive for taking memory cell interactions into account.

This example provides an efficient compression of data to be stored in a memory device. Reasons for this may be e.g.:
- in case that the memory device is realized with high speed interfaces, a very high flexibility is achieved; the data input/output into the memory device or out of the memory device is no longer a bottleneck; as a consequence, compression of the data to be stored may be provided using distinct dies or even involving different die types;
- compression of the data may be very effective as background operation, since there is no major conflict as on a conventional simple type of bus structure in a memory device;
- different dies may be used: In this case, if data memory device input, data memory device output and data transfer within the memory device is fast, then the sensing time of the memory device (e.g., a NAND memory device) may become visible for a user; using a plurality of dies for sensing a plurality of (e.g., two) memory pages put on top of each other in the compression scheme may be carried out fully in parallel;
- different die types may be used: In this case, there may be one die specialized (specifically configured) to receive incoming data at high data rates (SLC, short bit lines for fast programming); then, the data may be compressed to another type of die that is specialized (specifically configured) for taking multiple levels (better cost efficiency per bit on this die while the SLC can save all the MLC overhead-page buffer etc);
- the task of compressing the data may be assigned to different dedicated controller resources and can be decoupled from taking additional data into, e.g., a memory cell arrangement (e.g., a solid state drive (SSD)) at the same time; in this sense, the operation can run autonomously.

In an alternative example, it may be provided that various components of the memory device such as, e.g., memory cell arrangements or logic components, of the same type may be grouped into commonly addressable (and possibly hierarchically structured) groups of, e.g., memory cell arrangements or logic components.

Figure 14:
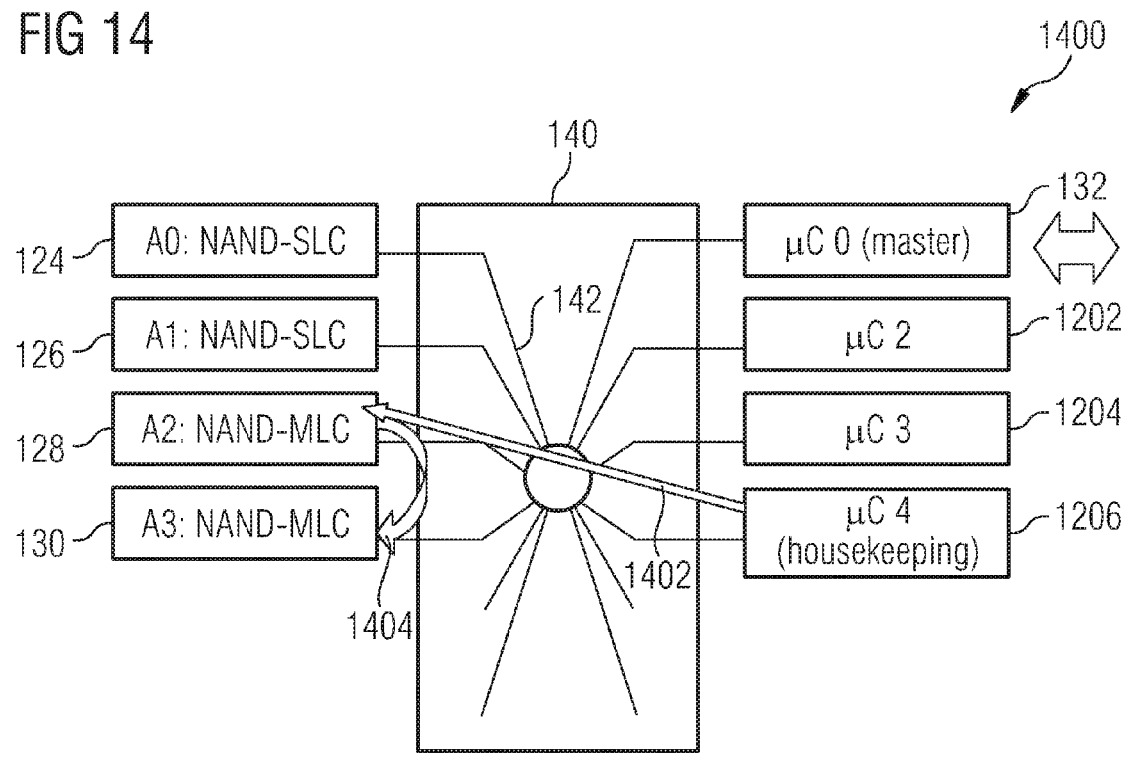
FIG. 14 shows another example of a memory device illustrating another example of a method for operating the memory device.
Figure 15:
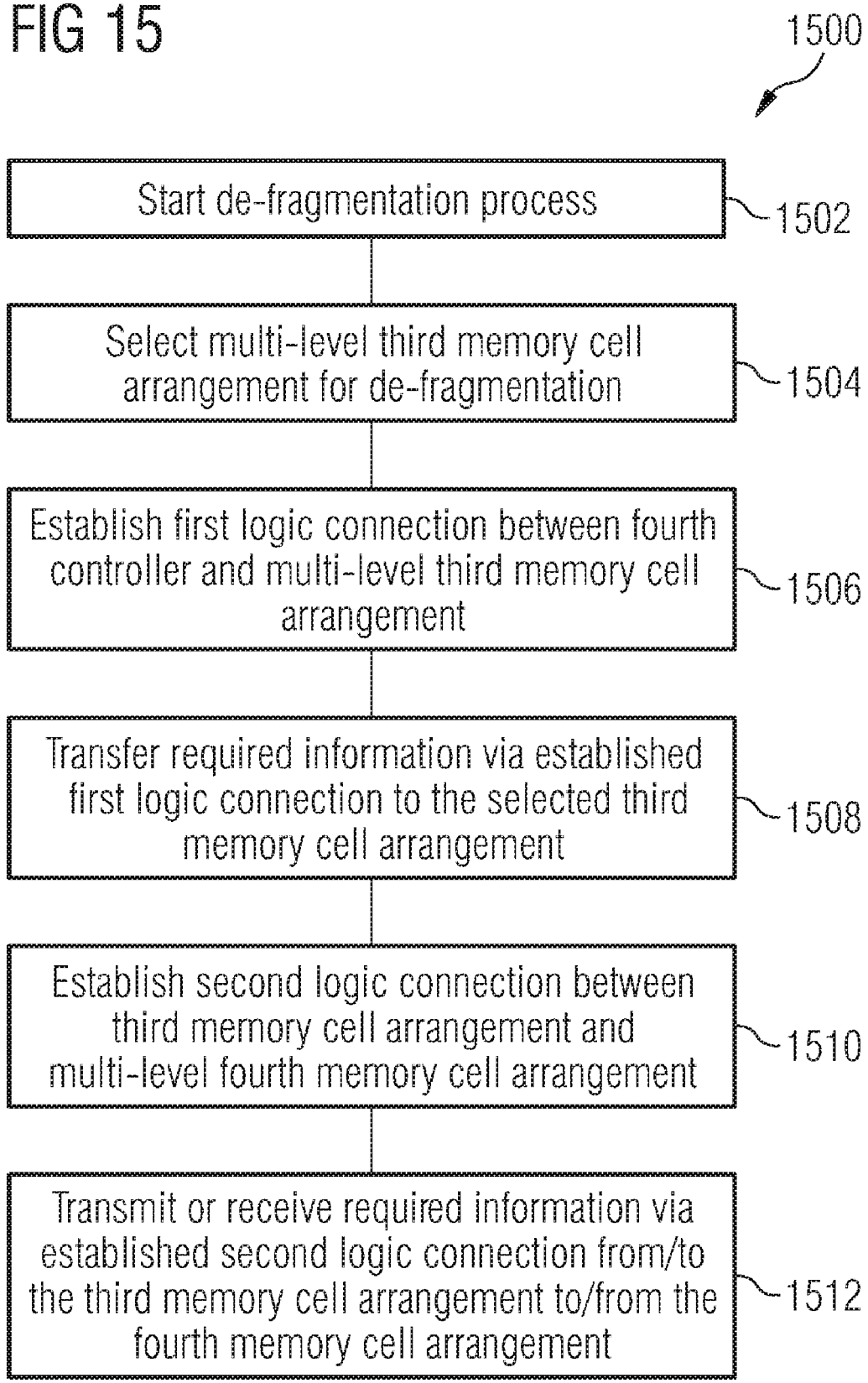
FIG. 15 shows a method for operating the memory device of FIG. 14.

FIG. 14 shows an example of a memory device 1400 illustrating an example of a method for operating the memory device. Furthermore, FIG. 15 shows a method 1500 for operating the memory device 1400.

The memory device 1400 is in its structure similar to the memory device 1200 of FIG. 12. Therefore, in order to avoid redundancy, a repeated description of the individual components that are similar is omitted and the components are designated with the same reference numbers.

In addition to the example shown in FIG. 12, in the memory device 1400, the fourth controller 1206 is configured as a de-fragmentation controller, as will be described in more detail below.

In this example, a memory device 1400 is provided capable to do, e.g., autonomous de-fragmentation of data already stored in the memory device 1400 (e.g., within a Flash memory device 1400). Thus, programming operations may be speeded up and the available memory space may be optimized.

In this example, it should be mentioned that memory devices (e.g., NAND flash memory devices) are desired to operate at high programming performance. This may be ensured as long as the flash memory is empty and data can be written into it using a continuous physical address space. Upon using the memory device (e.g., a flash memory device) further, it might occur that parts of the content of the memory cells are released by the file system of the memory device for being erased but they are not physically erased yet, since part of the respective memory erase sector is still in use. Finally, before being able to write into a memory sector again, the used parts would have to be relocated and the memory sector would have to be erased. In this example, such relocation could be used to de-fragment data and copy data belonging to the same file to adjacent physical addresses (e.g., within the same memory sector) of the memory cell arrangement. With respect to the read speed this de-fragmentation may be attractive for a memory device such as, e.g., a solid state disc (SSD) memory device, because data belonging together might in this case after de-fragmentation be erased together, so illustratively, a good "house-keeping" makes "house-keeping" easier.

In this example, as shown in FIG. 15, in 1502, the memory device 1400 (e.g. the fourth controller 1206) starts a de-fragmentation process.

Then, in 1504, the fourth controller 1206 selects a memory cell arrangement to be de-fragmented (in this example the third memory cell arrangement 128), and, in 1506, e.g., in response to a corresponding request from the fourth controller 1206 to the first controller 132, a first logic connection 1402 is established between the fourth controller 1206 and the third memory cell arrangement 128 by the first controller 132. The selection may, e.g., be carried out by the fourth controller 1206, wherein it may determine, e.g., memory sectors with low usage degree (furthermore, the fourth controller 1206 may determine the target address for relocation of the memory pages to be transferred during the de-fragmentation process).

Then, in 1508, the fourth controller 1206 transmits the information required for de-fragmentation (e.g., one or more corresponding command data packets) via the established first logic connection 1402 to the third memory cell arrangement 128. Then, in 1510, e.g., in response to a corresponding request from the fourth controller 1206 to the first controller 132, a second logic connection 1404 is established between the third memory cell arrangement 128 and the fourth memory cell arrangement 130 by the first controller 132. Subsequently, in 1512, the third memory cell arrangement 128 transmits to or receives from the fourth memory cell arrangement 130 the information required for de-fragmentation (e.g., one or more corresponding data packets) via the established second logic connection 1404. Within the de-fragmentation, memory sectors no longer required in the third memory cell arrangement 128 may be released by copying respective memory pages which are still used, to the fourth memory cell arrangement 130 (e.g. via the second logic connection 1404). Then, as soon as the respective memory sector in the third memory cell arrangement 128 is free, it may be erased for future use.

Within a memory device adopting, e.g., a switch for fast data transfer and connectivity to multiple controller resources, the release of memory sectors for erase operations (e.g., in the context of a de-fragmentation operation) is possible as background operation:

The data transfer from one memory cell arrangement to another memory cell arrangement (e.g., from one flash to another flash) is not a bottleneck, since the memory cell arrangements (e.g., the flash units) do not need to wait for each other in order to avoid interference;

a dedicated controller resource (e.g., the fourth controller 1206) may be attributed to the task of "housekeeping", while others may take care for other tasks like programming or ECC.

In this example, the following assumptions are made:

The memory device is powered to perform the de-fragmentation operation;

a power down protection is provided in order to ensure that the de-fragmentation may be safely completed.

Figure 16:
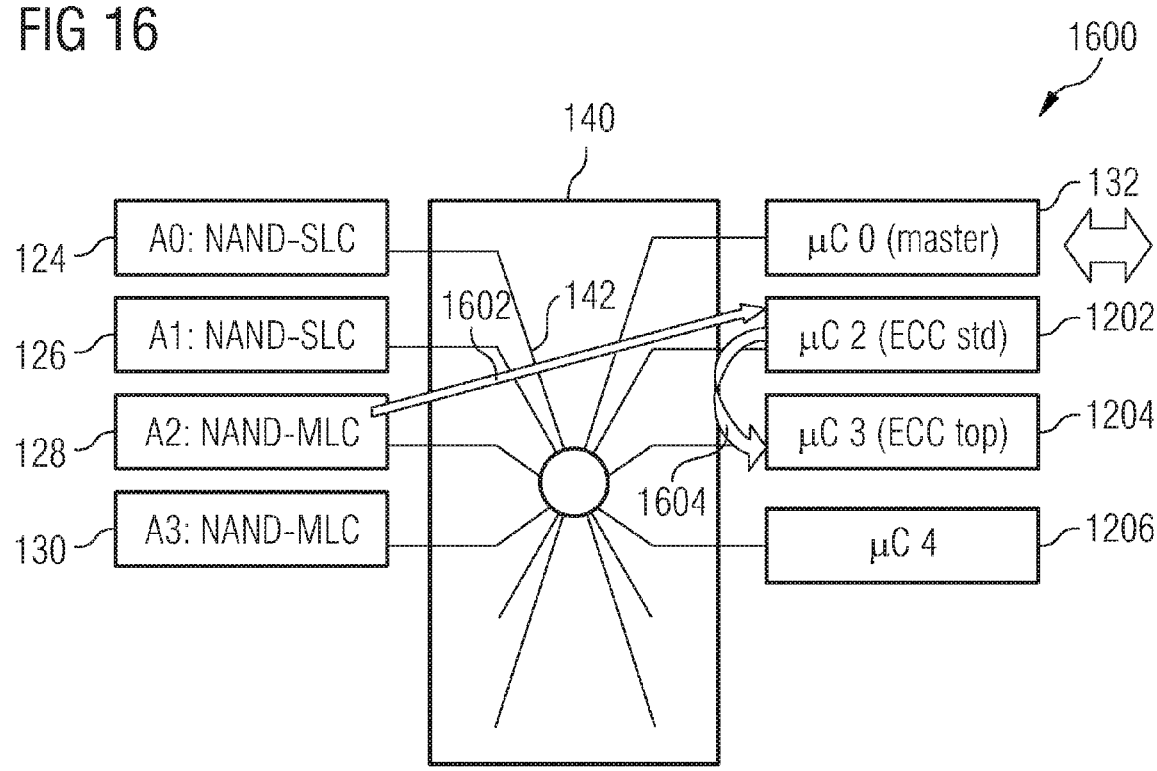
FIG. 16 shows yet another example of a memory device illustrating yet another example of a method for operating the memory device.
Figure 17:
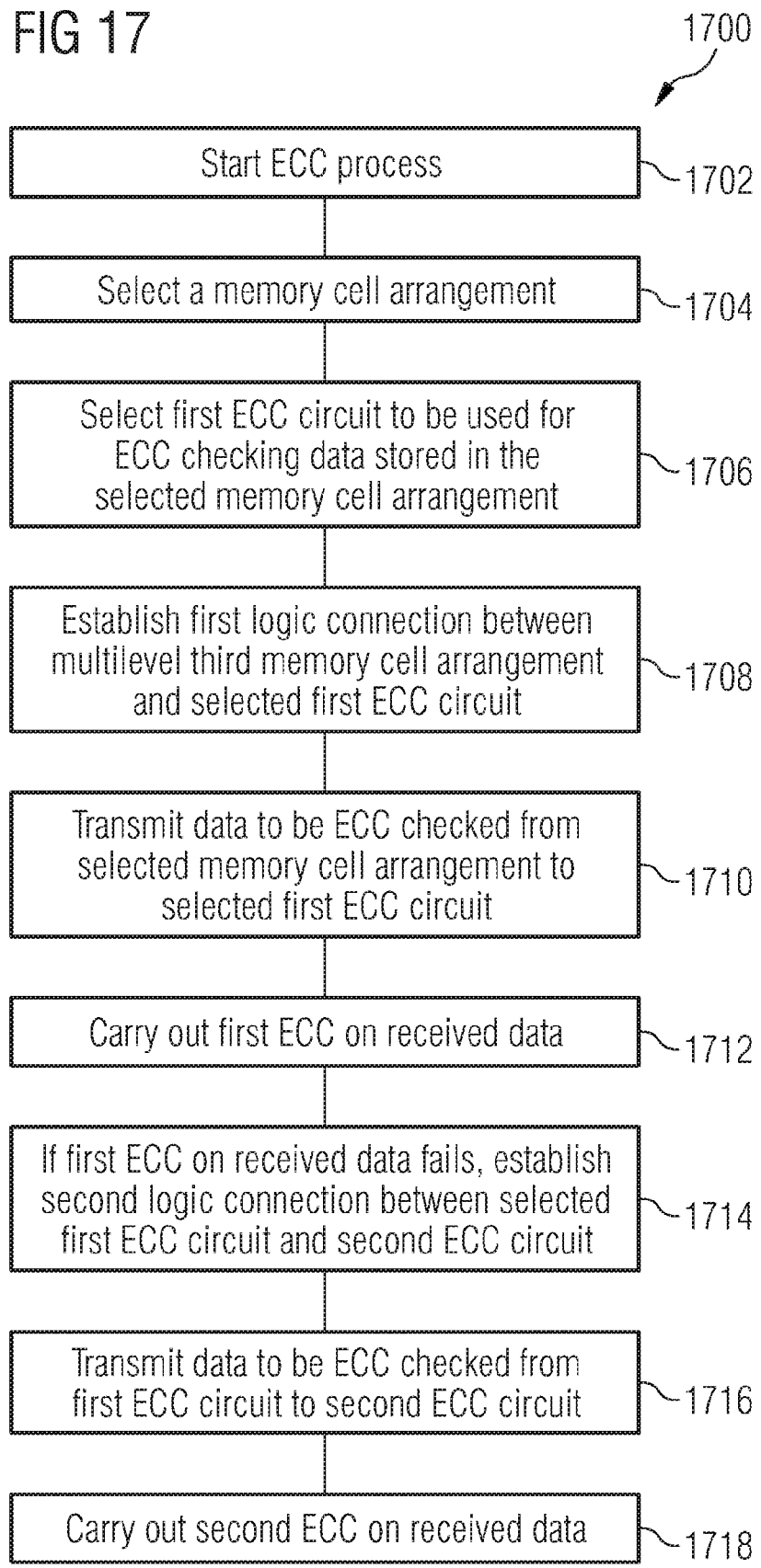
FIG. 17 shows a method for operating the memory device of FIG. 16.

FIG. 16 shows an example of a memory device 1600 illustrating an example of a method for operating the memory device. Furthermore, FIG. 17 shows a method 1700 for operating the memory device 1600.

The memory device 1600 is in its structure similar to the memory device 1200 of FIG. 12 and to the memory device 1400 of FIG. 14. Therefore, in order to avoid redundancy, a repeated description of the individual components that are similar is omitted and the components are designated with the same reference numbers.

In contrast to the example shown in FIG. 12, in the memory device 1600, the second controller 1202 is configured as a first error correction (ECC) circuit 1202 and the third controller 1204 is configured as a second error correction (ECC) circuit 1204, as will be described in more detail below. The first error correction circuit 1202 may be configured to correct errors in the data stored in the memory cells of the various memory cell arrangements, and the second error correction circuit 1204 may be configured to correct errors in the data stored in the memory cells of the various memory cell arrangements. In an implementation, the second error correction circuit 1204 has a higher error correction capability (e.g., provides a larger Hamming distance) than the first error correction circuit 1202.

In this example, a memory device 1600 is provided capable to do an efficient assignment of ECC tasks to controller resources by using the architecture of a memory device in accordance with an embodiment.

In this example, it should be mentioned that ECC is covering statistical phenomena and in large memory dies (e.g., large flash memory dies), there may be large statistical ensembles: a typical number is that $10^5$ to $10^6$ ECC units should pass without an occurring ECC fail, i.e., an event that no error correction is possible for the respective ECC unit provided to the ECC circuit(s).

This means, that there is a high chance to achieve the average failure number but due to the high number of attempts, also the unlikely cases of uncorrectable errors might occur in a high capacity memory device. ECC is usually dimensioned to cover the unlikely cases to some extent, so for most ECC units, a much less developed ECC capability would be enough.

In this example, a highly efficient ECC organization can be realized by proper assignment of data to various ECC resources.

In this example, as shown in FIG. 17, in 1702, the memory device 1600 starts an ECC process.

Then, in 1704, a memory cell arrangement (e.g., the third memory cell arrangement 128) which stores the data to be checked using an ECC, is selected.

Furthermore, a first ECC circuit to be used for ECC checking the specified data stored in the selected memory cell arrangement, is selected in 1706.

In 1708, in response to a corresponding request, a first logic connection 1602 between the selected memory cell arrangement (e.g., the third memory cell arrangement 128) and the selected first error correction circuit 1202 (having a "lower" standard ECC capability) is established using the controllable connections 142 in the connecting circuit arrangement 140.

Then, in 1710, the data to be ECC checked are transmitted from the selected memory cell arrangement (e.g., the third memory cell arrangement 128) to the selected first error correction circuit 1202 via the established first logic connection 1602.

Then, in 1712, a first ECC check process is carried out on the received data.

If the first ECC fails on this data in the first error correction circuit 1202, in 1714, in response to a corresponding request, a second logic connection 1604 is established between the selected first error correction circuit 1202 and the second error correction circuit 1204 (which has a higher ECC capability than the first error correction circuit 1202) using the controllable connections 142 in the connecting circuit arrangement 140. In other words, the second logic connection 1604 may be provided between the first error correction circuit 1202 and the second error correction circuit 1204 using the controllable connections 142 in case that the first error correction circuit 1202 is unable to correct an error in the data stored in the memory cells of the memory cell arrangement connected to the first error correction circuit 1202.

In 1716, the data to be ECC checked are transmitted from the first error correction circuit 1202 to the second error correction circuit 1204 via the established second logic connection 1604.

Then, in 1718, a second ECC check process (which is more powerful than the first ECC check process) is carried out on the received data.

Within a memory device adopting, e.g., a switch for fast data transfer and connectivity to multiple controller resources, the handling of ECC correction can be done very efficiently:

For most cases a "standard" ECC is enough to handle data (e.g., provided by the first ECC circuit 1202), while in rare cases a more "powerful" ECC is needed (and, e.g., provided by the second ECC circuit 1204). It is efficient to use the less "powerful" ECC circuit for all memory cells arrangements (e.g., all flash memory units) of the memory device and only for the cases, where it is needed, the more "powerful" ECC circuit may be used; alternatively, by way of example, the second ECC circuit 1204 may be used in case the first ECC circuit 1202 is busy and an ECC circuit is required;

the switch may be used to direct data to the proper resource, decision may be done, e.g., by checksum accompanying the data or a failure message of the "standard" ECC; the data may be fetched from the respective controller or from the array again, for example, from the selected memory cell arrangement (in this case, another logic connection from the selected memory cell arrangement to the second ECC circuit would be provided).

As shown in FIGS. 22A and 22B, in some embodiments, memory devices such as those described herein may be used in modules.

In FIG. 22A, a memory module 2200 is shown, on which one or more memory devices 2204 are arranged on a substrate 2202. The memory device 2204 may include numerous memory cells, each of which uses a memory element in accordance with an embodiment. The memory module 2200 may also include one or more electronic devices 2206, which may include memory, processing circuitry, control circuitry, addressing circuitry, bus interconnection circuitry, or other circuitry or electronic devices that may be combined on a module with a memory device, such as the memory device 2204. Additionally, the memory module 2200 includes multiple electrical connections 2208, which may be used to connect the memory module 2200 to other electronic components, including other modules.

As shown in FIG. 22B, in some embodiments, these modules may be stackable, to form a stack 2250. For example, a stackable memory module 2252 may contain one or more memory devices 2256, arranged on a stackable substrate 2254. The memory device 2256 contains memory cells that employ memory elements in accordance with an embodiment. The stackable memory module 2252 may also include one or more electronic devices 2258, which may include memory, processing circuitry, control circuitry, addressing circuitry, bus interconnection circuitry, or other circuitry or electronic devices that may be combined on a module with a memory device, such as the memory device 2256. Electrical connections 2260 are used to connect the stackable memory module 2252 with other modules in the stack 2250, or with other electronic devices. Other modules in the stack 2250 may include additional stackable memory modules, similar to the stackable memory module 2252 described above, or other types of stackable modules, such as stackable processing modules, control modules, communication modules, or other modules containing electronic components.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A memory device, comprising:
   a plurality of memory cell arrangements, each memory cell arrangement comprising a plurality of memory cells and a control circuit to control access to the memory cells of the respective memory cell arrangement;
   a connecting circuit arrangement coupled to the plurality of memory cell arrangements and providing a plurality of controllable connections via a plurality of connecting circuit terminals, the memory cell arrangements being connected with at least one connecting circuit terminal of the plurality of connecting circuit terminals, wherein the connecting circuit arrangement is configured to provide arbitrarily controllable signal flow connections between the plurality of connecting circuit terminals;
   a connecting circuit arrangement controller configured to control the connecting circuit arrangement to simultaneously provide a plurality of logic connections to the memory cell arrangements using the controllable connections; and
   wherein the plurality of memory cell arrangements comprise a first memory cell arrangement and a second memory cell arrangement;
   wherein the connecting circuit arrangement controller is configured to control the connecting circuit:
      to provide a logic connection between the first memory cell arrangement and the second memory cell arrangement using the controllable connections; and
      to transfer data stored in the first memory cell arrangement to the second memory cell arrangement via the logic connection.

2. The memory device of claim 1, wherein at least some of the memory cell arrangements comprise non-volatile memory cells.

3. The memory device of claim 1, wherein at least some of the memory cell arrangements comprise charge storing memory cells.

4. The memory device of claim 1, wherein at least some of the memory cell arrangements comprise a plurality of serially source-to-drain coupled memory cells.

5. The memory device of claim 1, wherein the connecting circuit arrangement is configured to provide arbitrarily controllable signal flow connections between the plurality of connecting circuit terminals in accordance with a circuit switch technology.

6. The memory device of claim 1, wherein the connecting circuit arrangement is configured to provide arbitrarily controllable signal flow connections between the plurality of connecting circuit terminals in accordance with a packet switch technology.

7. The memory device of claim 1, further comprising:
   at least one logic component configured to provide at least one logic function;
   wherein the connecting circuit arrangement is further coupled to the at least one logic component.

8. The memory device of claim 1,
   wherein the connecting circuit arrangement controller is configured to control the connecting circuit
      to transfer the data stored in the first memory cell arrangement to the second memory cell arrangement via the logic connection such that the data stored in the first memory cell arrangement are de-fragmented upon storage in the second memory cell arrangement.

9. A memory device, comprising:
   a plurality of memory cell arrangements, each memory cell arrangement comprising a plurality of memory cells and a control circuit to control access to the memory cells of the respective memory cell arrangement;
   a connecting circuit arrangement coupled to the plurality of memory cell arrangements and providing a plurality of controllable connections via a plurality of connecting circuit terminals, the memory cell arrangements being connected with at least one connecting circuit terminal of the plurality of connecting circuit terminals, wherein the connecting circuit arrangement is configured to provide arbitrarily controllable signal flow connections between the plurality of connecting circuit terminals;
   a connecting circuit arrangement controller configured to control the connecting circuit arrangement to simultaneously provide a plurality of logic connections to the memory cell arrangements using the controllable connections; and
   wherein the plurality of memory cell arrangements comprise a first memory cell arrangement having a first storage density and a second memory cell arrangement having a second storage density, wherein the second storage density is higher than the first storage density;
   wherein the connecting circuit arrangement controller is configured to control the connecting circuit:
      to provide a logic connection between the first memory cell arrangement and the second memory cell arrangement using the controllable connections; and
      to transfer data stored in the first memory cell arrangement to the second memory cell arrangement via the logic connection.

10. The memory device of claim 9,
wherein the first memory cell arrangement comprises memory cells comprising a first number of memory states;
wherein the second memory cell arrangement comprises memory cells comprising a second number of memory states; and
wherein the second number of memory states is higher than the first number of memory states.

11. A memory module, comprising:
a plurality of integrated circuits, wherein at least one integrated circuit of the plurality of integrated circuits comprises a memory device, the device comprising:
a plurality of memory cell arrangements, each memory cell arrangement comprising a plurality of memory cells and a control circuit to control access to the plurality of memory cells of the respective memory cell arrangement;
a connecting circuit arrangement coupled to the plurality of memory cell arrangements and providing a plurality of controllable connections via a plurality of connecting circuit terminals, the memory cell arrangements each being connected with at least one connecting circuit terminal of the plurality of connecting circuit terminals, wherein the connecting circuit arrangement is configured to provide arbitrarily controllable signal flow connections between respective memory cell arrangements connected to corresponding ones of the plurality of connecting circuit terminals; and
a connecting circuit controller configured to control the connecting circuit to simultaneously provide a plurality of logic connections to the memory cell arrangements using the controllable connections.

12. A method for transferring data in a memory device, the method comprising:
transferring data from a first memory cell arrangement comprising a plurality of memory cells to a second memory cell arrangement comprising a plurality of memory cells via a connecting circuit arrangement coupled to the first and second memory cell arrangements and providing a plurality of controllable connections via a plurality of connecting circuit terminals, the first and second memory cell arrangements being connected with at least one connecting circuit terminal of the plurality of connecting circuit terminals, wherein the connecting circuit arrangement is configured to provide arbitrarily controllable signal flow connections between the plurality of connecting circuit terminals;
wherein the data are transferred via a logic connection using the controllable connections; and
wherein simultaneously, a further logic connection is provided to a memory cell arrangement of the memory cell arrangements using the controllable connections; and
wherein transferring data from the first memory cell arrangement to the second memory cell arrangement is performed such that the data stored in the first memory cell arrangement are de-fragmented upon storage in the second memory cell arrangement.

13. A method for transferring data in a memory device, the method comprising:
transferring data from a first memory cell arrangement comprising a plurality of memory cells to a second memory cell arrangement comprising a plurality of memory cells via a connecting circuit arrangement coupled to the first and second memory cell arrangements and providing a plurality of controllable connections via a plurality of connecting circuit terminals, the first and second memory cell arrangements being connected with at least one connecting circuit terminal of the plurality of connecting circuit terminals wherein the connecting circuit arrangement is configured to provide arbitrarily controllable signal flow connections between the plurality of connecting circuit terminals;
wherein the data are transferred via a logic connection using the controllable connections;
wherein simultaneously, a further logic connection is provided to a memory cell arrangement of the memory cell arrangements using the controllable connections; and
wherein the first memory cell arrangement has a first storage density and the second memory cell arrangement has a second storage density, wherein the second storage density is higher than the first storage density.

14. The method of claim 13, wherein the data stored in the first memory cell arrangement are transferred to the second memory cell arrangement via the logic connection in a background transfer mode.

15. The method of claim 13,
wherein the first memory cell arrangement comprises memory cells comprising a first number of memory states;
wherein the second memory cell arrangement comprises memory cells comprising a second number of memory states; and
wherein the second number of memory states is higher than the first number of memory states.

\* \* \* \* \*